United States Patent
Araki et al.

(10) Patent No.: US 8,184,398 B2
(45) Date of Patent: May 22, 2012

(54) MAGNETIC HEAD THAT SUPPRESSES PROTRUSION OF MEDIUM FACING SURFACE CAUSED BY HEAT OF COIL

(75) Inventors: Hironori Araki, Milpitas, CA (US);
Yoshitaka Sasaki, Milpitas, CA (US);
Hiroyuki Ito, Milpitas, CA (US);
Takehiro Horinaka, Milpitas, CA (US);
Kazuo Ishizaki, Milpitas, CA (US);
Shigeki Tanemura, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 715 days.

(21) Appl. No.: 12/314,565

(22) Filed: Dec. 12, 2008

(65) Prior Publication Data
US 2010/0149687 A1     Jun. 17, 2010

(51) Int. Cl.
*G11B 5/127*     (2006.01)
*C25F 3/02*     (2006.01)
(52) U.S. Cl. ............. 360/123.12; 428/815; 216/22
(58) Field of Classification Search ............... None
See application file for complete search history.

(56) References Cited

U.S. PATENT DOCUMENTS

| | | | |
|---|---|---|---|
| 6,396,660 B1 * | 5/2002 | Jensen et al. | 360/125.75 |
| 6,466,404 B1 * | 10/2002 | Crue et al. | 360/125.53 |
| 6,751,055 B1 * | 6/2004 | Alfoqaha et al. | 360/125.56 |
| 6,989,963 B2 | 1/2006 | Kautzky et al. | |
| 7,898,767 B2 * | 3/2011 | Yamanaka et al. | 360/125.31 |
| 2003/0090834 A1 * | 5/2003 | Kamarajugadda et al. | 360/123 |
| 2006/0215313 A1 * | 9/2006 | Hsiao et al. | 360/123 |
| 2007/0064344 A1 * | 3/2007 | Etoh et al. | 360/125 |

FOREIGN PATENT DOCUMENTS
JP     A-2004-111034     4/2004

* cited by examiner

*Primary Examiner* — Kevin Bernatz
(74) *Attorney, Agent, or Firm* — Oliff & Berridge, PLC

(57) ABSTRACT

A magnetic head includes a coil, a pole layer, and a coil adjacent layer. The coil includes a winding portion having two side surfaces. The coil adjacent layer is adjacent to at least part of the whole of the two side surfaces of the winding portion. The coil adjacent layer is formed of a nonmagnetic material having a linear thermal expansion coefficient of $5 \times 10^{-6}/°$ C. or smaller at a temperature of 25° C. to 100° C. and having a thermal conductivity of 40 W/m·K or higher at a temperature of 25° C.

12 Claims, 12 Drawing Sheets

MAGNETIC HEAD THAT SUPPRESSES PROTRUSION OF MEDIUM FACING SURFACE CAUSED BY HEAT OF COIL

BACKGROUND OF THE INVENTION

1. Field of the Invention

The present invention relates to a magnetic head for use in a magnetic disk drive, and more specifically, to a magnetic head for use for writing data on a recording medium by means of a perpendicular magnetic recording system.

2. Description of the Related Art

The recording systems of magnetic read/write apparatuses include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

In each of the longitudinal magnetic recording system and the perpendicular magnetic recording system, magnetic heads typically used have a structure in which a read head having a magnetoresistive element (hereinafter also referred to an MR element) for reading and a write head having an induction-type electromagnetic transducer for writing are stacked on a substrate.

In each of the longitudinal magnetic recording system and the perpendicular magnetic recording system, the write head includes a coil for generating a magnetic field corresponding to data to be written on the recording medium, and a pole layer for allowing a magnetic flux corresponding to the magnetic field generated by the coil to pass and for generating a write magnetic field for writing the data on the recording medium.

A magnetic head for use in a magnetic disk drive such as a hard disk drive is typically provided in a slider. The slider has a medium facing surface that faces toward the recording medium. The medium facing surface has an air-inflow-side end and an air-outflow-side end. The slider is designed to slightly fly over the surface of the recording medium by means of an airflow that comes from the air-inflow-side end into the space between the medium facing surface and the recording medium. The magnetic head is typically disposed near the air-outflow-side end of the medium facing surface of the slider.

To improve the recording density and the signal-to-noise ratio, a reduction in flying height of the slider is required. For example, it is expected that a reduction in flying height of the slider to 2 nm or smaller will be required to achieve an areal recording density of 400 Gbpsi or greater. However, a reduction in flying height of the slider causes the slider to more easily collide with the recording medium, and thus increases the possibility of damage to the recording medium and the magnetic head.

In addition, there is a problem that in a magnetic head, heat generated by the coil during operation causes expansion of a coil insulating layer disposed around the coil, thereby causing protrusion of part of the medium facing surface. If the amount of protrusion of the part of the medium facing surface is great, the slider becomes more likely to collide with the recording medium, and therefore it becomes difficult to reduce the flying height of the slider. This makes it difficult to improve the recording density and the signal-to-noise ratio.

Typically, a resist is often used as the material of the coil insulating layer. Resists are greater in thermal expansion coefficient than alumina ($Al_2O_3$), which is often used as an insulating material in a magnetic head. In a magnetic head in which a resist is used as the material of the coil insulating layer, it is therefore difficult to suppress the protrusion of part of the medium facing surface induced by the heat generated by the coil.

U.S. Patent Application Publication No. US 2007/0064344 A1 discloses a magnetic head in which $SiO_2$, Si nitride or Si oxide having a low thermal expansion coefficient is used as the material of the coil insulating layer. In this magnetic head, however, it is difficult to dissipate heat generated by the coil during operation, because $SiO_2$, Si nitride and Si oxide are low in thermal conductivity. Consequently, in this magnetic head, the temperature of the coil greatly increases during operation, so that it becomes difficult to suppress the protrusion of part of the medium facing surface induced by the heat generated by the coil.

OBJECT AND SUMMARY OF THE INVENTION

It is an object of the present invention to provide a magnetic head capable of suppressing protrusion of part of the medium facing surface induced by heat generated by the coil, and a method of manufacturing such a magnetic head.

A magnetic head of the present invention includes: a medium facing surface that faces toward a recording medium; a coil including a winding portion having two side surfaces, the coil generating a magnetic field corresponding to data to be written on the recording medium; a pole layer having an end face located in the medium facing surface, the pole layer allowing a magnetic flux corresponding to the magnetic field generated by the coil to pass and generating a write magnetic field for writing the data on the recording medium; and a coil adjacent layer that is adjacent to at least part of the whole of the two side surfaces of the winding portion. The coil adjacent layer is formed of a nonmagnetic material having a linear thermal expansion coefficient of $5\times10^{-6}/°$ C. or smaller at a temperature of 25° C. to 100° C. and having a thermal conductivity of 40 W/m·K or higher at a temperature of 25° C.

In the present invention, when the nonmagnetic material used to form the coil adjacent layer is an insulating material, the coil adjacent layer may be adjacent to at least part of the whole of the two side surfaces of the winding portion in such a manner as to directly contact the at least part. When the nonmagnetic material used to form the coil adjacent layer is a conductive material, the coil adjacent layer is adjacent to at least part of the whole of the two side surfaces of the winding portion with an insulating film provided in between.

In the magnetic head of the present invention, the nonmagnetic material used to form the coil adjacent layer may be one of SiC and W. In this case, the magnetic head further includes an insulating film disposed between the coil adjacent layer and the at least part of the whole of the two side surfaces of the winding portion. The nonmagnetic material used to form the coil adjacent layer may be AlN.

In the magnetic head of the present invention, the coil adjacent layer may have a groove that accommodates at least part of the winding portion. It is not required that the coil adjacent layer be exposed at the medium facing surface.

In the magnetic head of the present invention, the write magnetic field generated by the pole layer may be for use for writing data on the recording medium by means of a perpendicular magnetic recording system. In this case, the magnetic head may further include a shield formed of a magnetic material, and a gap layer formed of a nonmagnetic material. The shield may include a shield layer having an end face located in the medium facing surface at a position forward of the end face of the pole layer along the direction of travel of the recording medium, and the gap layer may be disposed between the pole layer and the shield layer. The end face of the pole layer located in the medium facing surface may have a side adjacent to the gap layer, and this side may define the track width.

A method of manufacturing the magnetic head of the present invention includes the steps of: forming the pole layer; forming the coil adjacent layer; and forming the coil.

In the method of manufacturing the magnetic head of the present invention, the nonmagnetic material used to form the coil adjacent layer may be one of SiC and W, and the magnetic head may further include an insulating film disposed between the coil adjacent layer and the at least part of the whole of the two side surfaces of the winding portion. In this case, the method of manufacturing the magnetic head further includes the step of forming the insulating film performed between the step of forming the coil adjacent layer and the step of forming the coil. The nonmagnetic material used to form the coil adjacent layer may be AlN.

In the method of manufacturing the magnetic head of the present invention, the coil adjacent layer may have a groove that accommodates at least part of the winding portion. In this case, the step of forming the coil adjacent layer may include the step of forming a nonmagnetic layer made of the nonmagnetic material used to form the coil adjacent layer, and the step of forming the groove in the nonmagnetic layer so that the nonmagnetic layer becomes the coil adjacent layer. In the step of forming the coil, the coil may be formed such that at least part of the coil is accommodated in the groove after the step of forming the groove. It is not required that the coil adjacent layer be exposed at the medium facing surface.

In the method of manufacturing the magnetic head of the present invention, the write magnetic field generated by the pole layer may be for use for writing data on the recording medium by means of a perpendicular magnetic recording system. In this case, the magnetic head may further include a shield formed of a magnetic material and a gap layer formed of a nonmagnetic material, and the method of manufacturing the magnetic head may further include the step of forming the gap layer and the step of forming the shield. The shield may include a shield layer having an end face located in the medium facing surface at a position forward of the end face of the pole layer along the direction of travel of the recording medium, and the gap layer may be disposed between the pole layer and the shield layer. The end face of the pole layer located in the medium facing surface may have a side adjacent to the gap layer, and this side may define the track width.

According to the present invention, since the nonmagnetic material used to form the coil adjacent layer is small in linear thermal expansion coefficient, the expansion of the coil adjacent layer induced by the heat generated by the coil is suppressed. Furthermore, since the nonmagnetic material used to form the coil adjacent layer is high in thermal conductivity, dissipation of the heat of the coil is accelerated. These features of the present invention make it possible to suppress the protrusion of part of the medium facing surface induced by the heat generated by the coil.

Other objects, features and advantages of the present invention will become fully apparent from the following description.

DETAILED DESCRIPTION OF THE PREFERRED EMBODIMENT

Figure 1:
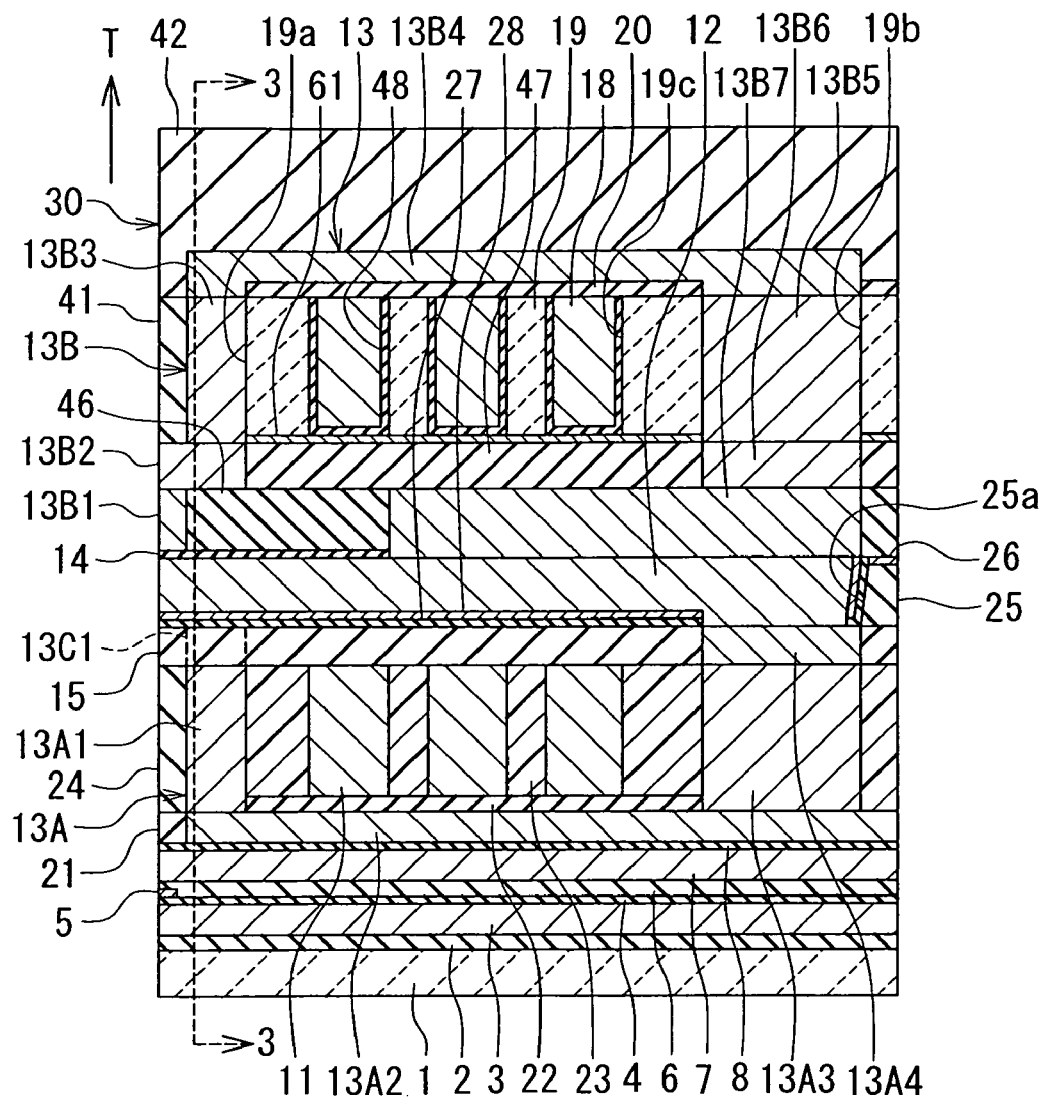
FIG. 1 is a cross-sectional view illustrating the configuration of a magnetic head of an embodiment of the invention.
Figure 2:
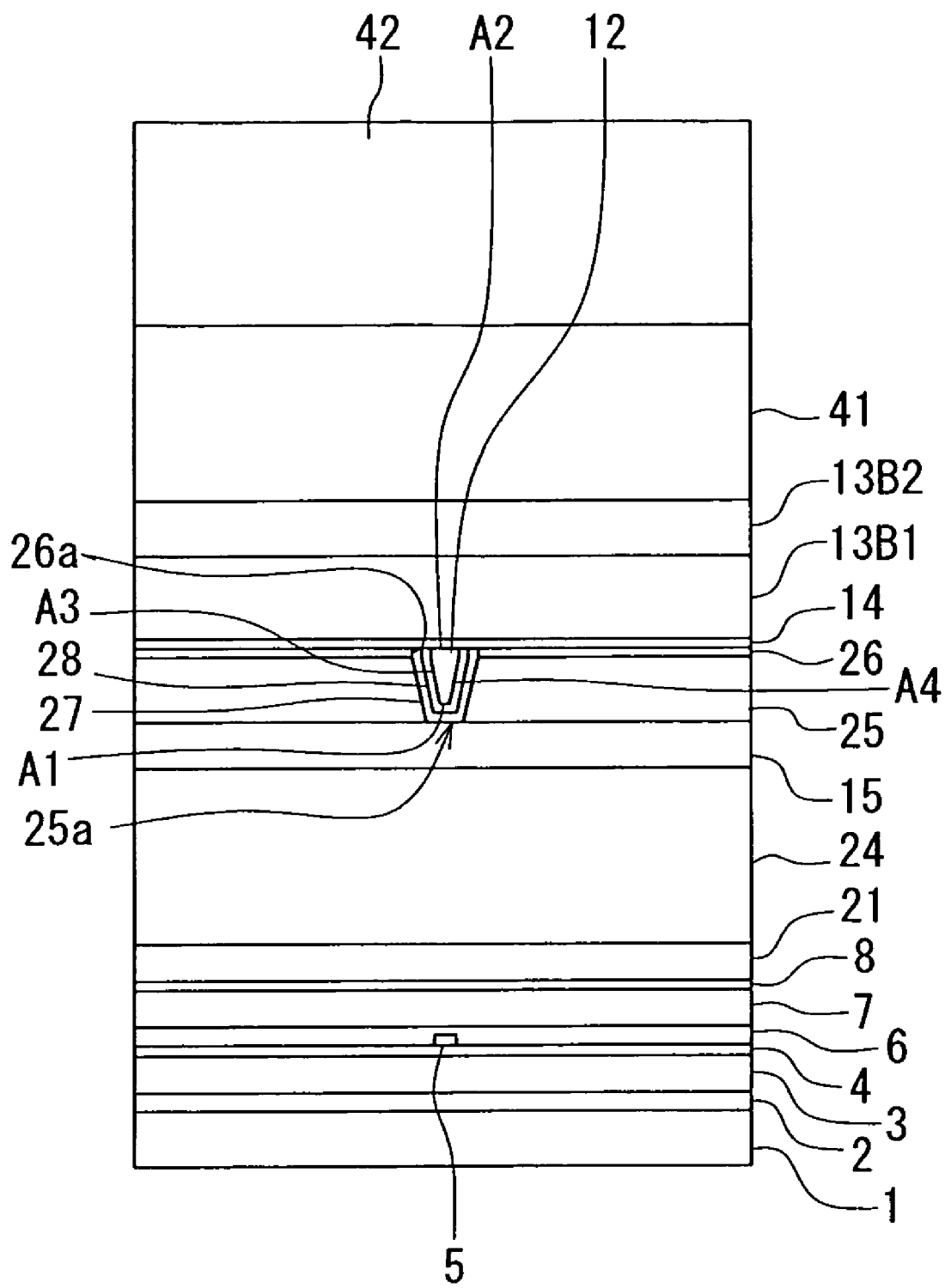
FIG. 2 is a front view illustrating the medium facing surface of the magnetic head of the embodiment of the invention.
Figure 3:
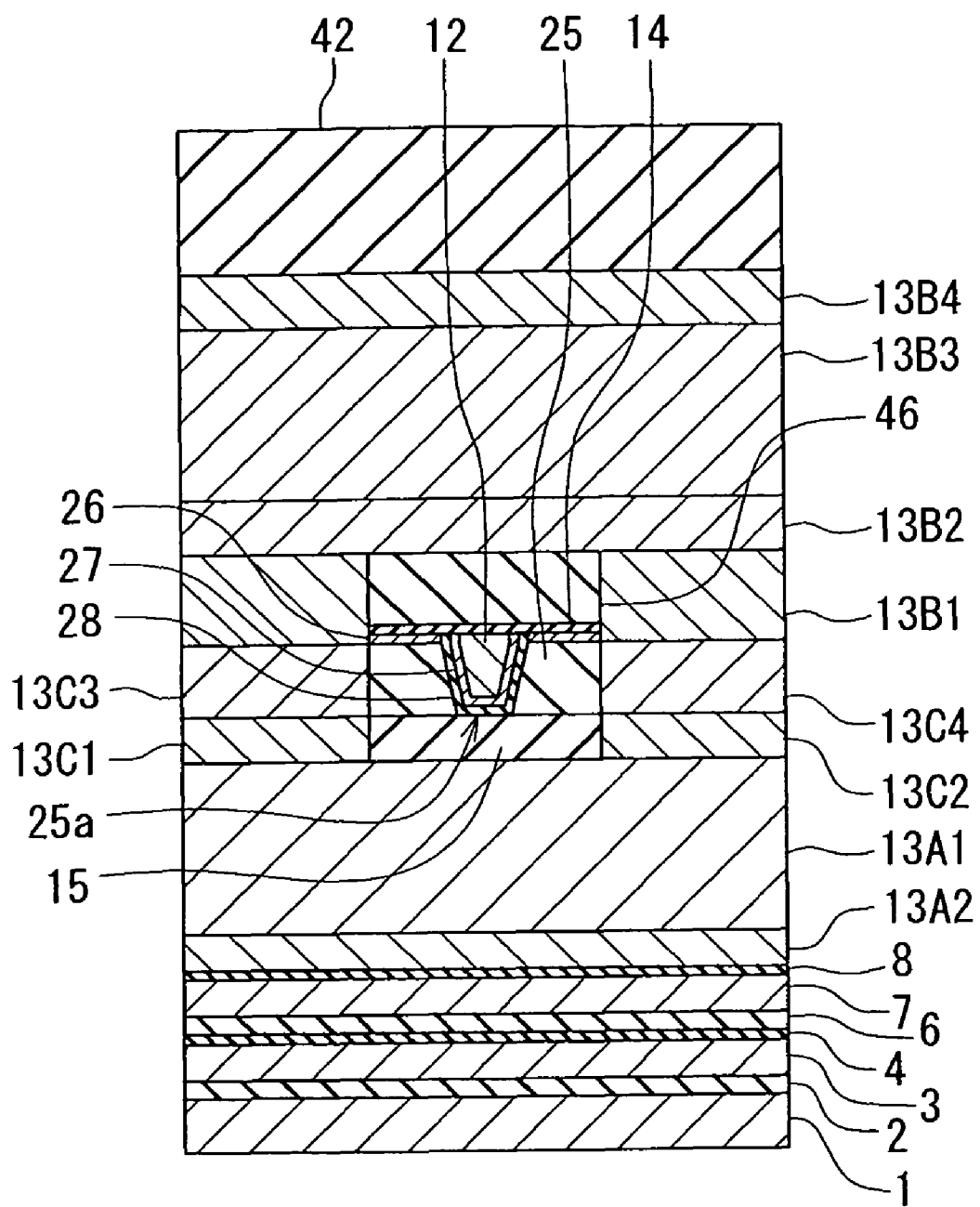
FIG. 3 is a cross-sectional view taken along line 3-3 of FIG. 1.
Figure 4:
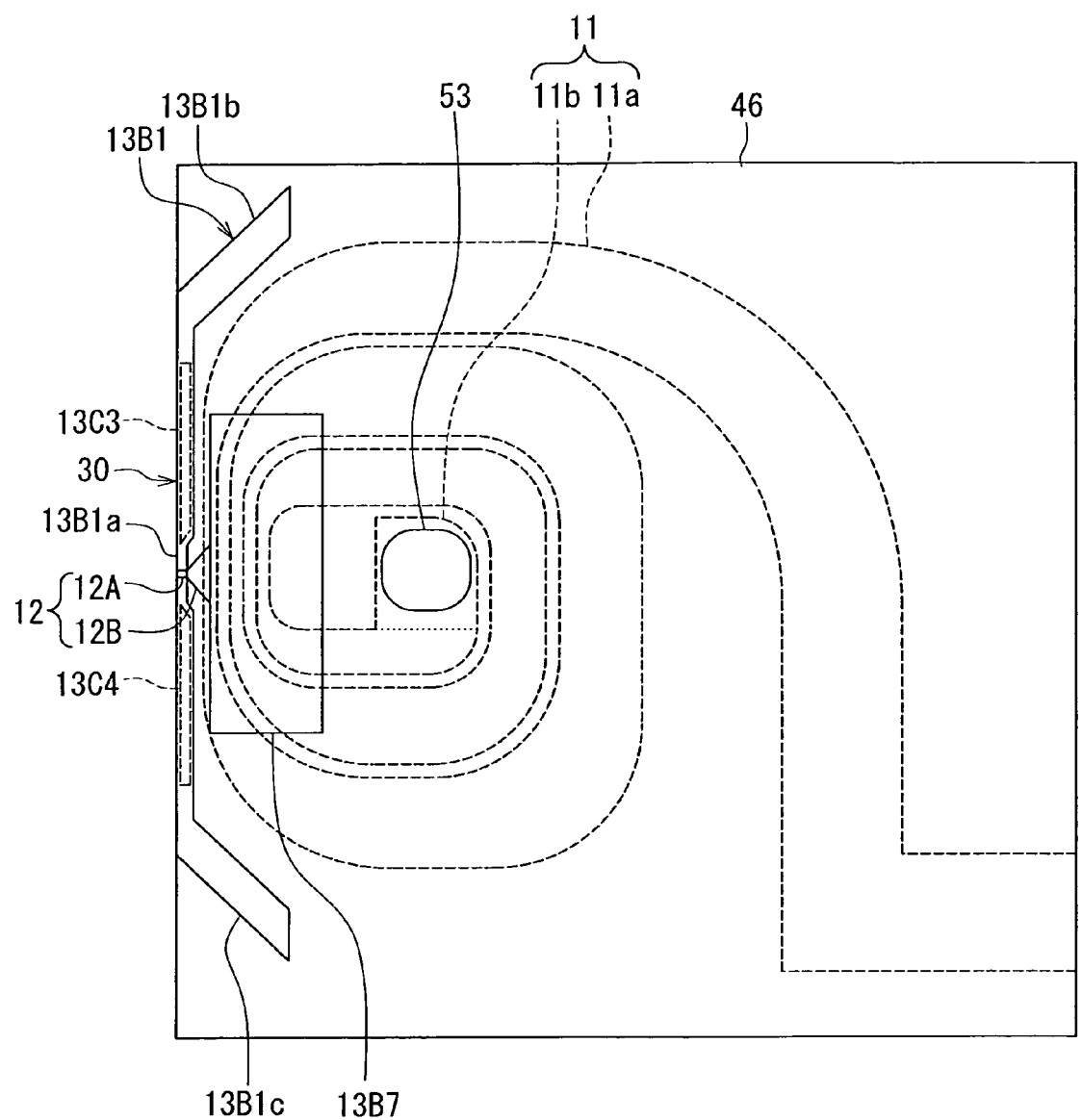
FIG. 4 is a top view illustrating part of a second portion of a shield and elements in the neighborhood thereof in the magnetic head of the embodiment of the invention.
Figure 5:
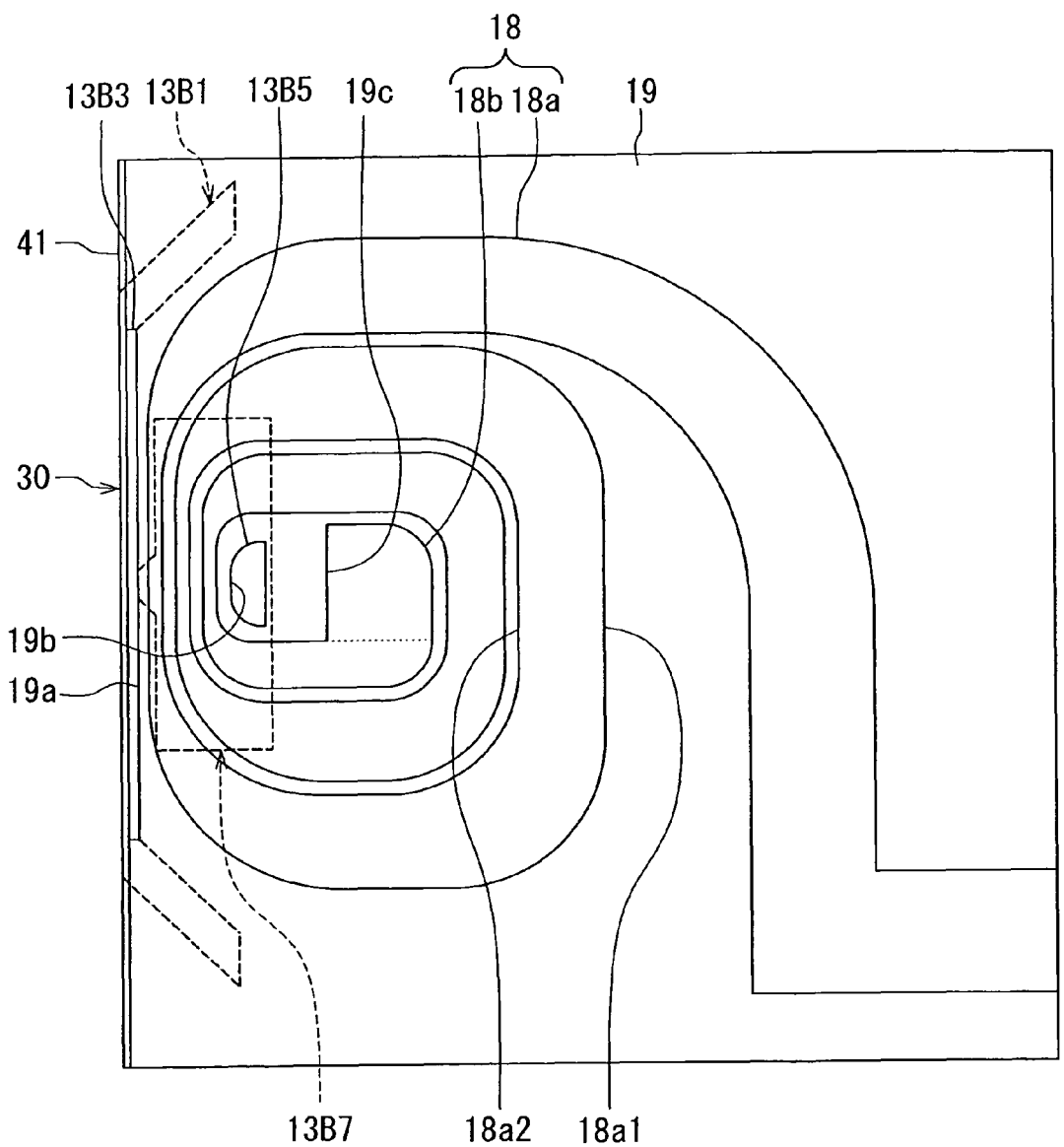
FIG. 5 is a top view illustrating a second coil and elements in the neighborhood thereof in the magnetic head of the embodiment of the invention.

An embodiment of the present invention will now be described in detail with reference to the drawings. Reference is first made to FIG. 1 to FIG. 5 to describe the configuration of a magnetic head of the embodiment of the invention. The magnetic head of the present embodiment is for use for perpendicular magnetic recording. FIG. 1 is a cross-sectional view illustrating the configuration of the magnetic head of the present embodiment. FIG. 1 illustrates a cross section perpendicular to the medium facing surface and the top surface of the substrate. In FIG. 1 the arrow marked with T shows the direction of travel of a recording medium. FIG. 2 is a front view illustrating the medium facing surface of the magnetic head of the present embodiment. FIG. 3 is a cross-sectional view taken along line 3-3 of FIG. 1. FIG. 4 is a top view illustrating part of a second portion of a shield and elements in the neighborhood thereof in the magnetic head of the present embodiment. FIG. 5 is a top view illustrating a second coil and elements in the neighborhood thereof in the magnetic head of the present embodiment.

As illustrated in FIG. 1 to FIG. 3, the magnetic head of the present embodiment includes: a substrate 1 formed of a ceramic material such as aluminum oxide-titanium carbide ($Al_2O_3$—TiC); an insulating layer 2 formed of an insulating material such as alumina ($Al_2O_3$) and disposed on the substrate 1; a bottom shield layer 3 formed of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a top shield layer 7 formed of a magnetic material and disposed on the top shield gap film 6.

An end of the MR element 5 is located in a medium facing surface 30 that faces toward the recording medium. The MR element 5 may be an element formed of a magneto-sensitive film that exhibits a magnetoresistive effect, such as an AMR (anisotropic magnetoresistive) element, a GMR (giant magnetoresistive) element, or a TMR (tunneling magnetoresistive) element. The GMR element may be of a CIP (current-in-plane) type wherein a current used for detecting magnetic signals is fed in a direction nearly parallel to the planes of layers constituting the GMR element, or may be of a CPP (current-perpendicular-to-plane) type wherein a current used for detecting magnetic signals is fed in a direction nearly perpendicular to the planes of the layers constituting the GMR element.

The portion from the bottom shield layer 3 to the top shield layer 7 makes up a read head. The magnetic head further includes a nonmagnetic layer 8 formed of a nonmagnetic material and disposed on the top shield layer 7, and a write head disposed on the nonmagnetic layer 8. The nonmagnetic layer 8 is formed of alumina, for example. The write head includes a first coil 11, a second coil 18, a pole layer 12, a shield 13, and a gap layer 14.

As illustrated in FIG. 4 and FIG. 5, each of the first coil 11 and the second coil 18 is planar spiral-shaped. In addition, the first coil 11 and the second coil 18 are connected in series or in parallel. As illustrated in FIG. 4, the first coil 11 includes a winding portion 11a, and a connecting portion 11b coupled to an inner end of the winding portion 11a. The winding portion 11a has a top surface, a bottom surface, and two side surfaces that couple the top surface and the bottom surface to each other. The two side surfaces of the winding portion 11a are an outer side surface and an inner side surface. The connecting portion 11b is a portion connected to the second coil 18. In FIG. 4 the boundary between the winding portion 11a and the connecting portion 11b is shown with a dotted line.

As illustrated in FIG. 5, the second coil 18 includes a winding portion 18a, and a connecting portion 18b coupled to an inner end of the winding portion 18a. The winding portion 18a has a top surface, a bottom surface, and two side surfaces that couple the top surface and the bottom surface to each other. The two side surfaces of the winding portion 18a are an outer side surface 18a1 and an inner side surface 18a2. The connecting portion 18b is a portion connected to the connecting portion 11b of the first coil 11. In FIG. 5 the boundary between the winding portion 18a and the connecting portion 18b is shown with a dotted line.

The magnetic head further includes first to fourth connecting layers stacked in succession on the connecting portion 11b of the first coil 11. The first to fourth connecting layers are each formed of a conductive material. The connecting portion 18b of the coil 18 is connected to the connecting portion 11b of the coil 11 via the first to fourth connecting layers. FIG. 4 shows the third connecting layer 53. Although the first, second and fourth connecting layers are not shown, the second connecting layer is disposed below the third connecting layer 53, the first connecting layer is disposed below the second connecting layer, and the fourth connecting layer is disposed on the third connecting layer 53. The connecting portion 11b of the coil 11 is disposed below the first connecting layer. The connecting portion 18b of the coil 18 is disposed on the fourth connecting layer.

The coils 11 and 18 generate magnetic fields corresponding to data to be written on the recording medium. The pole layer 12 has an end face located in the medium facing surface 30, allows magnetic fluxes corresponding to the magnetic fields generated by the coils 11 and 18 to pass, and generates a write magnetic field for writing the data on the recording medium by means of the perpendicular magnetic recording system.

The shield 13 includes: a first portion 13A disposed backward of the pole layer 12 along the direction T of travel of the recording medium; a second portion 13B disposed forward of the pole layer 12 along the direction T of travel of the record-ing medium; and coupling portions 13C1, 13C2, 13C3 and 13C4. The first portion 13A, the second portion 13B, and the coupling portions 13C1, 13C2, 13C3 and 13C4 are each formed of a magnetic material. The material of these components can be any of CoFeN, CoNiFe, NiFe and CoFe, for example.

The first portion 13A includes a first layer 13A1, a second layer 13A2, a third layer 13A3, and a fourth layer 13A4 that are magnetically coupled. The second layer 13A2 is disposed on the nonmagnetic layer 8. The second layer 13A2 has an end face closer to the medium facing surface 30, and this end face is located at a distance from the medium facing surface 30. The magnetic head further includes an insulating layer 21 formed of an insulating material and disposed around the second layer 13A2 on the nonmagnetic layer 8, and an insulating layer 22 formed of an insulating material and disposed on a portion of the top surface the second layer 13A2. The insulating layers 21 and 22 are formed of alumina, for example. The first coil 11 is disposed on the insulating layer 22.

The first layer 13A1 and the third layer 13A3 are disposed on the second layer 13A2. The first layer 13A1 is disposed between the medium facing surface 30 and the coil 11. The third layer 13A3 is disposed farther from the medium facing surface 30 than is the first layer 13A1. The coil 11 is wound around the third layer 13A3. The fourth layer 13A4 is disposed on the third layer 13A3.

The magnetic head further includes an insulating layer 23 formed of an insulating material and disposed around the coil 11 and the third layer 13A3 and in the space between every adjacent turns of the coil 11, and an insulating layer 24 disposed around the insulating layer 23 and the first layer 13A1. Part of the insulating layer 24 covers an end face of the first layer 13A1 closer to the medium facing surface 30. The first layer 13A1, the third layer 13A3, the coil 11 and the insulating layers 23 and 24 have flattened top surfaces. The insulating layer 23 is formed of photoresist, for example. The insulating layer 24 is formed of alumina, for example. The coil 11 is formed of a conductive material such as copper. As previously mentioned, the first connecting layer is disposed on the connecting portion 11b of the coil 11.

The magnetic head further includes an insulating layer 15 disposed on the top surfaces of the first layer 13A1, the coil 11 and the insulating layers 23 and 24 around the fourth layer 13A4 and the first connecting layer, and a pole-layer-encasing layer 25 formed of a nonmagnetic material and disposed on the insulating layer 15. The insulating layer 15 is formed of alumina, for example. The pole-layer-encasing layer 25 has a groove 25a that opens at the top surface of the pole-layer-encasing layer 25 and that accommodates at least part of the pole layer 12. The groove 25a penetrates the pole-layer-encasing layer 25, and the level at which the bottom of the groove 25a is located coincides with the level at which the top surfaces of the insulating layer 15 and the fourth layer 13A4 are located. The pole-layer-encasing layer 25 further has an opening for exposing the top surface of the first connecting layer. The material used to form the pole-layer-encasing layer 25 may be, for example, an insulating material such as alumina, silicon oxide ($SiO_x$) or silicon oxynitride (SiON), or a nonmagnetic metal material such as Ru, Ta, Mo, Ti, W, NiCu, NiB or NiP.

The magnetic head further includes a nonmagnetic metal layer 26 formed of a nonmagnetic metal material and disposed on the top surface of the pole-layer-encasing layer 25. The nonmagnetic metal layer 26 has a penetrating opening 26a, and the edge of the opening 26a is located directly above the edge of the groove 25a at the top surface of the pole-layerencasing layer 25. The material used to form the nonmagnetic metal layer 26 may be any of Ta, Mo, W, Ti, Ru, Rh, Re, Pt, Pd, Ir, NiCr, NiP, NiB, AlCu, $WSi_2$, $TaSi_2$, $TiSi_2$, TiN, and TiW, for example.

The magnetic head further includes first and second nonmagnetic films 27 and 28 disposed in the groove 25a of the pole-layer-encasing layer 25 and in the opening 26a of the nonmagnetic metal layer 26. The first nonmagnetic film 27 is disposed to touch the surface of the groove 25a. The pole layer 12 is disposed apart from the surface of the groove 25a. The second nonmagnetic film 28 is disposed between the first nonmagnetic film 27 and the pole layer 12. The second nonmagnetic film 28 also functions as an electrode layer (seed layer) used when forming the pole layer 12 by plating. The nonmagnetic films 27 and 28 have openings for exposing the top surface of the fourth layer 13A4, and openings for exposing the top surface of the first connecting layer. The pole layer 12 touches the top surface of the fourth layer 13A4 through the openings of the nonmagnetic films 27 and 28.

The first nonmagnetic film 27 is formed of a nonmagnetic material. The material used to form the nonmagnetic film 27 can be an insulating material or a semiconductor material, for example. Examples of the insulating material usable to form the nonmagnetic film 27 include alumina, silicon oxide ($SiO_x$) and silicon oxynitride (SiON). Examples of the semiconductor material usable to form the nonmagnetic film 27 include polycrystalline silicon and amorphous silicon. The second nonmagnetic film 28 is formed of a nonmagnetic metal material. The second nonmagnetic film 28 can be formed of the same material as the nonmagnetic metal layer 26, for example.

The pole layer 12 is formed of a magnetic metal material. The pole layer 12 can be formed of any of NiFe, CoNiFe and CoFe, for example.

As illustrated in FIG. 3, the coupling portions 13C1 and 13C2 are disposed on the first layer 13A1. The coupling portion 13C3 is disposed on the coupling portion 13C1, and the coupling portion 13C4 is disposed on the coupling portion 13C2. The coupling portions 13C1, 13C3 and the coupling portions 13C2, 13C4 are disposed on both sides of the pole layer 12 that are opposite to each other in the track width direction.

The gap layer 14 is disposed to cover portions of the top surfaces of the pole layer 12 and the nonmagnetic metal layer 26 located near the medium facing surface 30. The gap layer 14 is formed of a nonmagnetic material. The material used to form the gap layer 14 may be an insulating material such as alumina, or a nonmagnetic conductive material such as Ru, NiCu, Ta, W, NiB or NiP.

The second portion 13B of the shield 13 includes a first layer 13B1, a second layer 13B2, a third layer 13B3, a fourth layer 13B4, a fifth layer 13B5, a sixth layer 13B6, and a top yoke layer 13B7 that are magnetically coupled. The first layer 13B1 is disposed on the gap layer 14. The first layer 13B1 has an end face located in the medium facing surface 30 at a position forward of the end face of the pole layer 12 along the direction T of travel of the recording medium. The first layer 13B1 corresponds to the shield layer of the present invention. In the medium facing surface 30, the end face of the first layer 13B1 is located at a predetermined distance from the end face of the pole layer 12, the distance being provided by the thickness of the gap layer 14. The thickness of the gap layer 14 is preferably within a range of 5 to 60 nm, such as 30 to 60 nm, for example. The end face of the pole layer 12 has a side adjacent to the gap layer 14, and this side defines the track width. The top yoke layer 13B7 is disposed on a portion of the pole layer 12 away from the medium facing surface 30.

The magnetic head further includes a nonmagnetic layer 46 formed of a nonmagnetic material and disposed around the first layer 13B1, the top yoke layer 13B7 and the connecting layer 53. The nonmagnetic layer 46 is formed of, for example, an inorganic insulating material. The inorganic insulating material may be alumina or silicon oxide, for example. The first layer 13B1, the top yoke layer 13B7, the connecting layer 53 and the nonmagnetic layer 46 have flattened top surfaces.

As illustrated in FIG. 3, the top surfaces of the coupling portions 13C3 and 13C4 touch the bottom surface of the first layer 13B1 at positions of both sides of the pole layer 12 that are opposite to each other in the track width direction. In addition, as illustrated in FIG. 4, the first layer 13B1 has a center portion 13B1a including the end face located in the medium facing surface 30, and two side portions 13B1b and 13B1c that are located at positions outside the center portion 13B1a along the track width direction and that are not exposed at the medium facing surface.

The second layer 13B2 is disposed on the first layer 13B1 and touches the top surface of the first layer 13B1. The second layer 13B2 has an end face located in the medium facing surface 30. The sixth layer 13B6 is disposed on the top yoke layer 13B7.

The magnetic head further includes a nonmagnetic layer 47 formed of a nonmagnetic material and disposed around the second layer 13B2, the sixth layer 13B6 and the fourth connecting layer. The nonmagnetic layer 47 is formed of, for example, an inorganic insulating material. The inorganic insulating material may be alumina or silicon oxide, for example. The second layer 13B2, the sixth layer 13B6, the fourth connecting layer and the nonmagnetic layer 47 have flattened top surfaces.

The magnetic head further includes an etching stopper film 61 formed of a nonmagnetic metal material and disposed on the nonmagnetic layer 47. The etching stopper film 61 is not disposed on the second layer 13B2, the sixth layer 13B6 and the fourth connecting layer. The material used to form the etching stopper film 61 may be NiCr or Ru, for example.

The magnetic head further includes a coil adjacent layer 19 disposed on the etching stopper film 61. The coil adjacent layer 19 is adjacent to at least part of the whole of the two side surfaces 18a1 and 18a2 of the winding portion 18a of the coil 18. In the example illustrated in FIG. 5, the coil adjacent layer 19 is adjacent to the whole of the two side surfaces 18a1 and 18a2 of the winding portion 18a. As illustrated in FIG. 5, the coil adjacent layer 19 has a groove 19a accommodating the third layer 13B3, a groove 19b accommodating the fifth layer 13B5, and a groove 19c accommodating at least part of the second coil 18. The third layer 13B3 is accommodated in the groove 19a, the fifth layer 13B5 is accommodated in the groove 19b, and at least part of the second coil 18 is accommodated in the groove 19c. The groove 19a is located above the top surface of the second layer 13B2. The groove 19b is located above the top surface of the sixth layer 13B6. A portion of the groove 19c that accommodates the connecting portion 18b of the coil 18 is located above the top surface of the fourth connecting layer. A portion of the groove 19c that accommodates the winding portion 18a of the coil 18 is located above the top surface of the etching stopper film 61. Each of the grooves 19a, 19b and 19c penetrates the coil adjacent layer 19.

The coil adjacent layer 19 is formed of a nonmagnetic material having a linear thermal expansion coefficient of $5 \times 10^{-6}/°$ C. or smaller at a temperature of 25° C. to 100° C. and having a thermal conductivity of 40 W/m·K or higher at a temperature of 25° C. The nonmagnetic material used to form the coil adjacent layer 19 is any of SiC, AlN and W (tungsten), for example. The linear thermal expansion coefficients and the thermal conductivities of these materials will be described in detail later.

The magnetic head further includes an insulating film 48 disposed in the groove 19c of the coil adjacent layer 19 at a position between the winding portion 18a of the coil 18 and each of the coil adjacent layer 19 and the etching stopper film 61. The insulating film 48 is disposed to touch the surface of the groove 19c and the top surface of the etching stopper film 61. The winding portion 18a of the coil 18 is insulated by the insulating film 48 from the coil adjacent layer 19 and the etching stopper film 61. The coil adjacent layer 19 is adjacent to at least part of the whole of the two side surfaces 18a1 and 18a2 of the winding portion 18a with the insulating film 48 in between. The insulating film 48 is formed of alumina or silicon oxide, for example. The coil 18 is formed of a conductive material such as copper.

The third layer 13B3 touches the top surface of the second layer 13B2. The third layer 13B3 has an end face closer to the medium facing surface 30, and this end face is located at a distance from the medium facing surface 30. The fifth layer 13B5 touches the top surface of the sixth layer 13B6. The second coil 18 is wound around the fifth layer 13B5.

The magnetic head further includes an insulating layer 41 formed of an insulating material and disposed around the third layer 13B3 and the coil adjacent layer 19. The third layer 13B3, the fifth layer 13B5, the coil 18, the coil adjacent layer 19, the insulating layer 41 and the insulating film 48 have flattened top surfaces. As illustrated in FIG. 5, the coil adjacent layer 19 is not exposed at the medium facing surface 30. The magnetic head further includes an insulating layer 20 disposed to cover the coil 18, the coil adjacent layer 19 and the insulating film 48. The insulating layers 20 and 41 are formed of alumina, for example.

The fourth layer 13B4 is disposed to couple the third layer 13B3 and the fifth layer 13B5 to each other. The fourth layer 13B4 has an end face closer to the medium facing surface 30, and this end face is located at a distance from the medium facing surface 30.

The magnetic head further includes a protection layer 42 formed of a nonmagnetic material and disposed to cover the second portion 13B. The protection layer 42 is formed of, for example, an inorganic insulating material such as alumina.

As described so far, the magnetic head of the present embodiment includes the medium facing surface 30 that faces toward the recording medium, the read head, and the write head. The read head and the write head are stacked on the substrate 1. The read head is disposed backward along the direction T of travel of the recording medium (in other words, disposed closer to the air inflow end of the slider), while the write head is disposed forward along the direction T of travel of the recording medium (in other words, disposed closer to the air outflow end of the slider).

The read head includes: the MR element 5 as the read element; the bottom shield layer 3 and the top shield layer 7 for shielding the MR element 5, portions of the shield layers 3 and 7 located on a side of the medium facing surface 30 being opposed to each other with the MR element 5 located in between; the bottom shield gap film 4 disposed between the MR element 5 and the bottom shield layer 3; and the top shield gap film 6 disposed between the MR element 5 and the top shield layer 7.

The write head includes the first coil 11, the second coil 18, the pole layer 12, the shield 13, and the gap layer 14.

The pole layer 12 is disposed in the groove 25a of the pole-layer-encasing layer 25 and in the opening 26a of the nonmagnetic metal layer 26, with the nonmagnetic films 27 and 28 disposed in between. The first nonmagnetic film 27 has a thickness within a range of 10 to 40 nm, for example. The thickness of the first nonmagnetic film 27 is not limited to this range, however, and can be freely chosen according to the track width. The second nonmagnetic film 28 has a thickness within a range of 30 to 100 nm, for example.

The shield 13 includes: the first portion 13A disposed backward of the pole layer 12 along the direction T of travel of the recording medium; the second portion 13B disposed forward of the pole layer 12 along the direction T of travel of the recording medium; and the coupling portions 13C1, 13C2, 13C3 and 13C4. Each of the first portion 13A and the second portion 13B is connected to a portion of the pole layer 12 away from the medium facing surface 30. A portion of the first coil 11 passes through a space surrounded by the pole layer 12 and the first portion 13A. A portion of the second coil 18 passes through a space surrounded by the pole layer 12 and the second portion 13B.

In a region closer to the medium facing surface 30 than is the portion of each of the first coil 11 and the second coil 18, the coupling portions 13C1, 13C2, 13C3 and 13C4 couple the first portion 13A to the second portion 13B without touching the pole layer 12. Specifically, as illustrated in FIG. 3, the coupling portions 13C1, 13C3 and the coupling portions 13C2, 13C4 are disposed on both sides of the pole layer 12 that are opposite to each other in the track width direction, and couple the first layer 13A1 of the first portion 13A to the first layer 13B1 of the second portion 13B.

The second portion 13B includes the first layer 13B1 and the second layer 13B2. The first layer 13B1 has the end face located in the medium facing surface 30 at a position forward of the end face of the pole layer 12 along the direction T of travel of the recording medium. The first layer 13B1 further has a bottom surface adjacent to the gap layer 14, and a top surface opposite to the bottom surface. The second layer 13B2 touches the top surface of the first layer 13B1. The second layer 13B2 has the end face located in the medium facing surface 30.

In the medium facing surface 30, the end face of the first layer 13B1 is located at a predetermined distance from the end face of the pole layer 12, the distance being provided by the thickness of the gap layer 14. The end face of the pole layer 12 has a side that is adjacent to the gap layer 14, and this side defines the track width.

Reference is now made to FIG. 2 and FIG. 4 to describe the shape of the pole layer 12 in detail. As illustrated in FIG. 4, the pole layer 12 includes a track width defining portion 12A having an end face located in the medium facing surface 30, and a wide portion 12B that is located farther from the medium facing surface 30 than is the track width defining portion 12A and that is greater in width than the track width defining portion 12A. The track width defining portion 12A has a width that does not change in accordance with the distance from the medium facing surface 30. For example, the wide portion 12B is equal in width to the track width defining portion 12A at the boundary with the track width defining portion 12A, and gradually increases in width with increasing distance from the medium facing surface 30 and then maintains a specific width to the end of the wide portion 12B. In the present embodiment, the track width defining portion 12A is a portion of the pole layer 12 from the end face located in the medium facing surface 30 to the point at which the width of the pole layer 12 starts to increase. Here, the length of the track width defining portion 12A taken in the direction perpendicular to the medium facing surface 30 is called a neck height. The neck height is within a range of 0.05 to 0.3 μm, for example.

As illustrated in FIG. 2, the end face of the pole layer 12 located in the medium facing surface 30 has: a first side A1 closest to the substrate 1; a second side A2 adjacent to the gap layer 14; a third side A3 connecting an end of the first side A1 to an end of the second side A2; and a fourth side A4 connecting the other end of the first side A1 to the other end of the second side A2. The second side A2 defines the track width. The end face of the pole layer 12 located in the medium facing surface 30 has a width that decreases with increasing distance from the gap layer 14. Each of the third side A3 and the fourth side A4 forms an angle within a range of, for example, 5 to 15 degrees with respect to the direction perpendicular to the top surface of the substrate 1. The length of the second side A2, that is, the track width, is within a range of 0.05 to 0.20 μm, for example.

In the present embodiment, throat height is the distance between the medium facing surface 30 and the point at which the space between the pole layer 12 and the second portion 13B of the shield 13 starts to increase as seen from the medium facing surface 30. In the present embodiment, the throat height is equal to the distance between the medium facing surface 30 and an edge of the bottom surface of the nonmagnetic layer 46 closest to the medium facing surface 30. The throat height is within a range of 0.05 to 0.3 μm, for example.

A method of manufacturing the magnetic head of the present embodiment will now be described. In the method of manufacturing the magnetic head of the present embodiment, first, as illustrated in FIG. 1 and FIG. 2, the insulating layer 2, the bottom shield layer 3 and the bottom shield gap film 4 are formed in this order on the substrate 1. Next, the MR element 5 and leads (not shown) connected to the MR element 5 are formed on the bottom shield gap film 4. Next, the MR element 5 and the leads are covered with the top shield gap film 6. Next, the top shield layer 7 and the nonmagnetic layer 8 are formed in this order on the top shield gap film 6.

Next, the second layer 13A2 of the first portion 13A of the shield 13 is formed on the nonmagnetic layer 8 by, for example, frame plating. Next, the insulating layer 21 is formed over the entire top surface of the stack. Next, the insulating layer 21 is polished by, for example, chemical mechanical polishing (hereinafter referred to as CMP), until the second layer 13A2 becomes exposed.

Next, the insulating layer 22 is formed on regions of the top surfaces of the second layer 13A2 and the insulating layer 21 where the coil 11 is to be disposed later. Next, the coil 11 is formed on the insulating layer 22 by, for example, frame plating. Next, the first layer 13A1 and the third layer 13A3 are formed on the second layer 13A2 by, for example, frame plating. However, the formation of the first layer 13A1 and the third layer 13A3 may precede the formation of the coil 11.

Next, the insulating layer 23 is formed around the coil 11 and the third layer 13A3 and in the space between every adjacent turns of the coil 11. Next, the insulating layer 24 is formed over the entire top surface of the stack. Next, the insulating layer 24 is polished by, for example, CMP, until the first layer 13A1, the third layer 13A3 and the coil 11 become exposed, and the top surfaces of the first layer 13A1, the third layer 13A3, the coil 11 and the insulating layers 23 and 24 are thereby flattened.

Next, the coupling portions 13C1 and 13C2 are formed on the first layer 13A1, the fourth layer 13A4 is formed on the third layer 13A3, and the first connecting layer is formed on the connecting portion 11b of the coil 11, each by frame plating, for example. Next, the insulating layer 15 is formed over the entire top surface of the stack. Next, the insulating layer 15 is polished by, for example, CMP, until the coupling portions 13C1 and 13C2, the fourth layer 13A4 and the first connecting layer become exposed, and the top surfaces of the coupling portions 13C1 and 13C2, the fourth layer 13A4, the first connecting layer and the insulating layer 15 are thereby flattened.

Next, the coupling portion 13C3 is formed on the coupling portion 13C1, and the coupling portion 13C4 is formed on the coupling portion 13C2, each by frame plating, for example. Next, a nonmagnetic layer is formed over the entire top surface of the stack. The nonmagnetic layer will later become the pole-layer-encasing layer 25 by undergoing formation of the groove 25a therein. Next, the nonmagnetic layer is polished by, for example, CMP, until the coupling portions 13C3 and 13C4 become exposed, and the top surfaces of the coupling portions 13C3 and 13C4 and the nonmagnetic layer are thereby flattened. Next, the nonmagnetic metal layer 26 having the penetrating opening 26a that has a shape corresponding to the groove 25a is formed on the top surface of the nonmagnetic layer. Next, a portion of the nonmagnetic layer exposed from the opening 26a of the nonmagnetic metal layer 26 is selectively etched to thereby form in the nonmagnetic layer the groove 25a and the opening for exposing the top surface of the first connecting layer. The nonmagnetic layer becomes the encasing layer 25 as a result of the formation of the groove 25a therein. The edge of the opening 26a of the nonmagnetic metal layer 26 is located directly above the edge of the groove 25a at the top surface of the encasing layer 25.

Next, the nonmagnetic films 27 and 28 are formed in succession on the entire top surface of the stack. The nonmagnetic films 27 and 28 are formed also in the groove 25a and the opening of the encasing layer 25. Next, the nonmagnetic films 27 and 28 are selectively etched to form the openings for exposing the top surface of the fourth layer 13A4 and the openings for exposing the top surface of the first connecting layer in the nonmagnetic films 27 and 28. Next, a magnetic layer that is to later become the pole layer 12 and the second connecting layer is formed on the top surface of the stack by, for example, frame plating. The magnetic layer is formed such that the top surface thereof is located higher than the top surfaces of the nonmagnetic metal layer 26 and the nonmagnetic films 27 and 28. Next, a coating layer made of alumina, for example, is formed over the entire top surface of the stack. Next, the coating layer, the magnetic layer and the nonmagnetic films 27 and 28 are polished by, for example, CMP, until the nonmagnetic metal layer 26 becomes exposed, and the top surfaces of the nonmagnetic metal layer 26, the coating layer, the magnetic layer and the nonmagnetic films 27 and 28 are thereby flattened. As a result of this polishing, a portion of the magnetic layer located in the groove 25a of the encasing layer 25 becomes the pole layer 12, while another portion of the magnetic layer located on the first connecting layer becomes the second connecting layer.

Next, the gap layer 14 is formed to cover portions of the top surfaces of the pole layer 12 and the nonmagnetic metal layer 26. Next, the first layer 13B1 of the second portion 13B of the shield 13 is formed on the gap layer 14 and the coupling layers 13C3 and 13C4, the top yoke layer 13B7 is formed on the pole layer 12, and the third connecting layer 53 is formed on the second connecting layer, each by frame plating, for example. Next, the nonmagnetic layer 46 is formed over the entire top surface of the stack. Next, the nonmagnetic layer 46 is polished by, for example, CMP, until the first layer 13B1, the top yoke layer 13B7 and the third connecting layer 53 become exposed, and the top surfaces of the first layer 13B1, the top yoke layer 13B7, the third connecting layer 53 and the nonmagnetic layer 46 are thereby flattened.

Next, the second layer 13B2 is formed on the first layer 13B1 and the nonmagnetic layer 46, the sixth layer 13B6 is formed on the top yoke layer 13B7, and the fourth connecting layer is formed on the third connecting layer 53, each by frame plating, for example. Next, the nonmagnetic layer 47 is formed over the entire top surface of the stack. Next, the nonmagnetic layer 47 is polished by, for example, CMP, until the second layer 13B2, the sixth layer 13B6 and the fourth connecting layer become exposed, and the top surfaces of the second layer 13B2, the sixth layer 13B6, the fourth connecting layer and the nonmagnetic layer 47 are thereby flattened.

Reference is now made to FIG. 6A to FIG. 12A and FIG. 6B to FIG. 12B to describe a series of steps from the step of forming the etching stopper film 61 to the step of forming the second coil 18. FIG. 6A to FIG. 12A and FIG. 6B to FIG. 12B each illustrate a stack of layers formed in the course of manufacturing the magnetic head. Each of FIG. 6A to FIG. 12A shows the top surface of a portion of the stack. Each of FIG. 6B to FIG. 12B shows a cross section of a portion of the stack near the medium facing surface, the cross section being perpendicular to the medium facing surface and the top surface of the substrate. Portions closer to the substrate 1 than the second layer 13B2 of the second portion 13B of the shield 13 are omitted in FIG. 6B to FIG. 12B. In FIG. 6A to FIG. 12A and FIG. 6B to FIG. 12B, "ABS" indicates the position at which the medium facing surface 30 is to be formed.

Figure 6A:
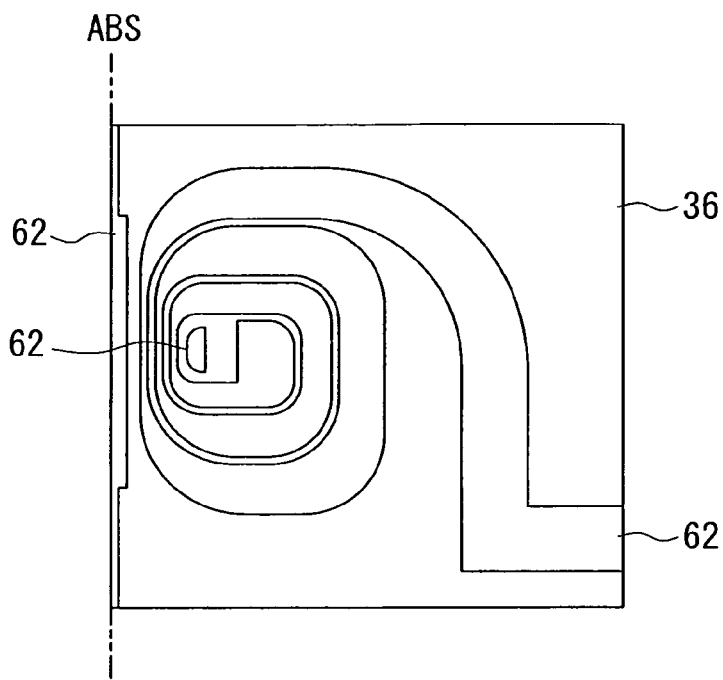
FIG. 6A and FIG. 6B are explanatory views illustrating a step of a method of manufacturing the magnetic head of the embodiment of the invention.
Figure 6B:
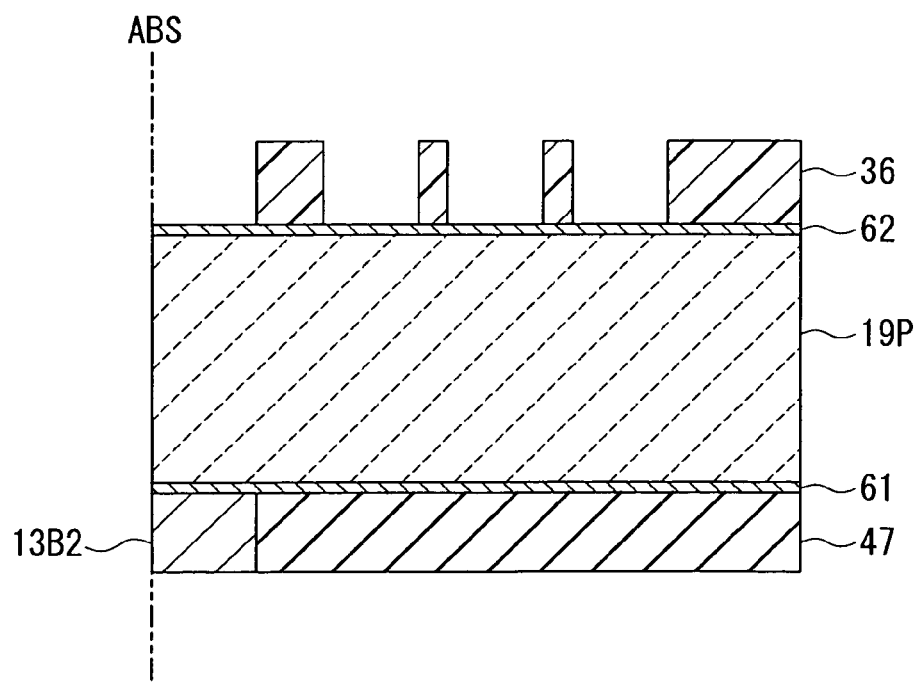

FIG. 6A and FIG. 6B illustrate a step that follows the step of flattening the top surfaces of the second layer 13B2, the sixth layer 13B6, the fourth connecting layer and the nonmagnetic layer 47. In this step, first, the etching stopper film 61 is formed over the entire top surface of the stack by, for example, sputtering. In the case where SiC is selected as the nonmagnetic material to form the coil adjacent layer 19, NiCr or Ru is suitable as the material of the etching stopper film 61. Next, a nonmagnetic layer 19P made of the nonmagnetic material selected to form the coil adjacent layer 19 is formed over the entire top surface of the stack. The nonmagnetic layer 19P will later become the coil adjacent layer 19 by undergoing formation of the grooves 19a, 19b and 19c therein. Next, a metal film 62 is formed on the nonmagnetic layer 19P by, for example, sputtering. The metal film 62 is formed of NiCr or Ru, for example. Next, a photoresist layer is formed on the metal film 62. Next, the photoresist layer is patterned to thereby form a mask 36. The mask 36 has an outer shape corresponding to the outer shape of the coil adjacent layer 19 to be formed later, and has a plurality of openings having respective shapes corresponding to the grooves 19a, 19b and 19c to be formed later.

Figure 7A:
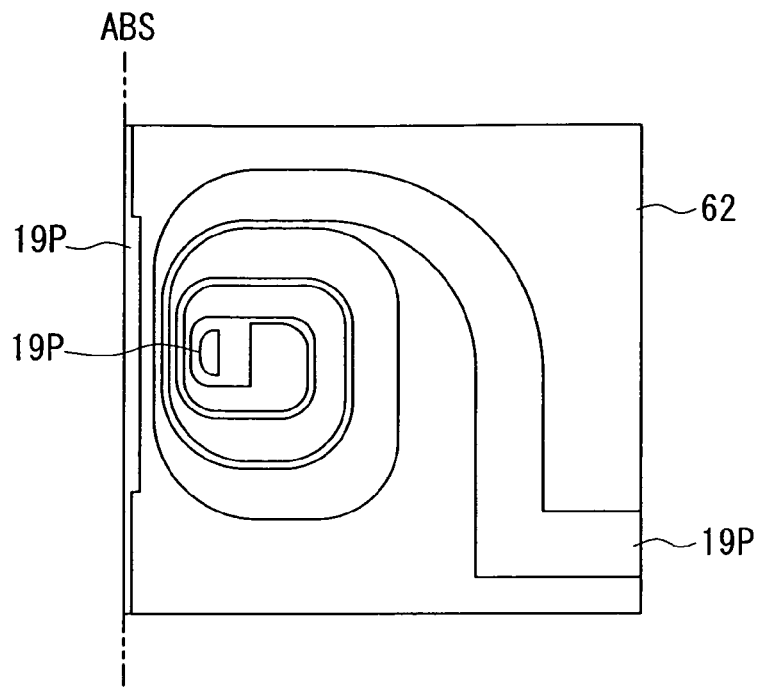
FIG. 7A and FIG. 7B are explanatory views illustrating a step that follows the step of FIG. 6A and FIG. 6B.
Figure 7B:
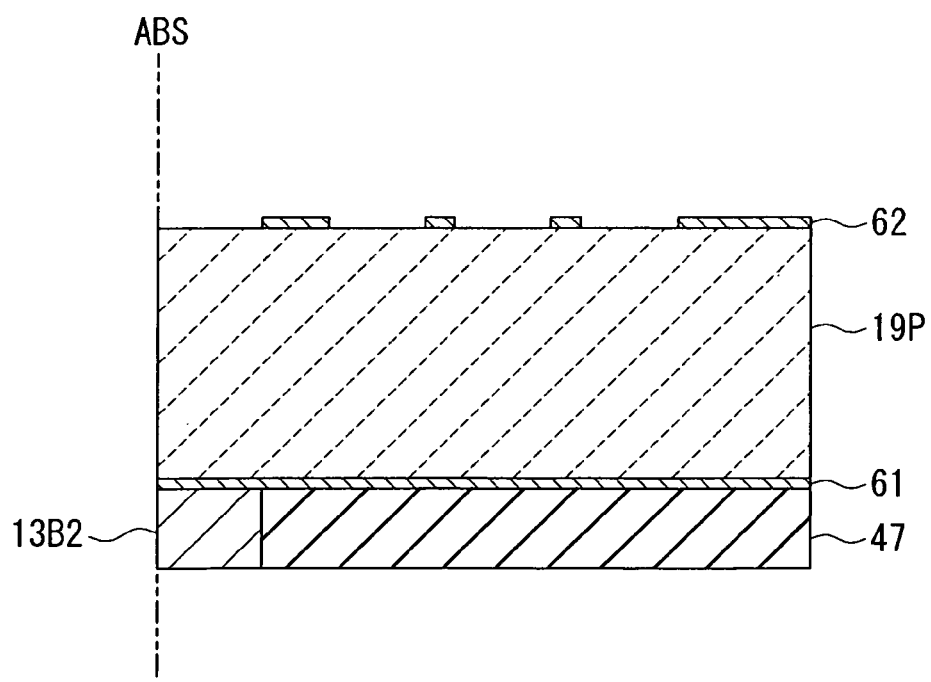

FIG. 7A and FIG. 7B illustrate the next step. In this step, first, portions of the metal film 62 other than a portion thereof located below the mask 36 are etched by, for example, ion milling. As a result, a plurality of penetrating openings are formed in the metal film 62, the openings having respective shapes corresponding to the grooves 19a, 19b and 19c to be formed later. Next, the mask 36 is removed.

Figure 8A:
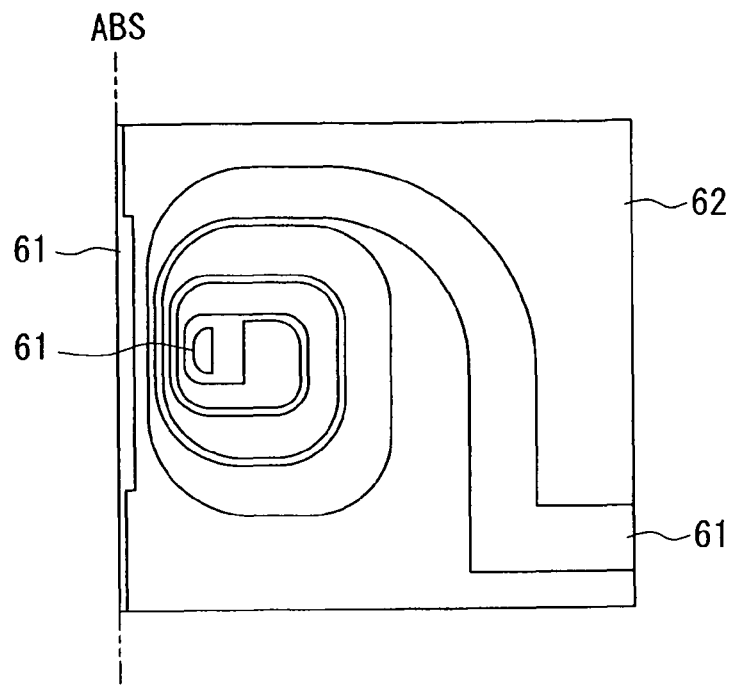
FIG. 8A and FIG. 8B are explanatory views illustrating a step that follows the step of FIG. 7A and FIG. 7B.
Figure 8B:
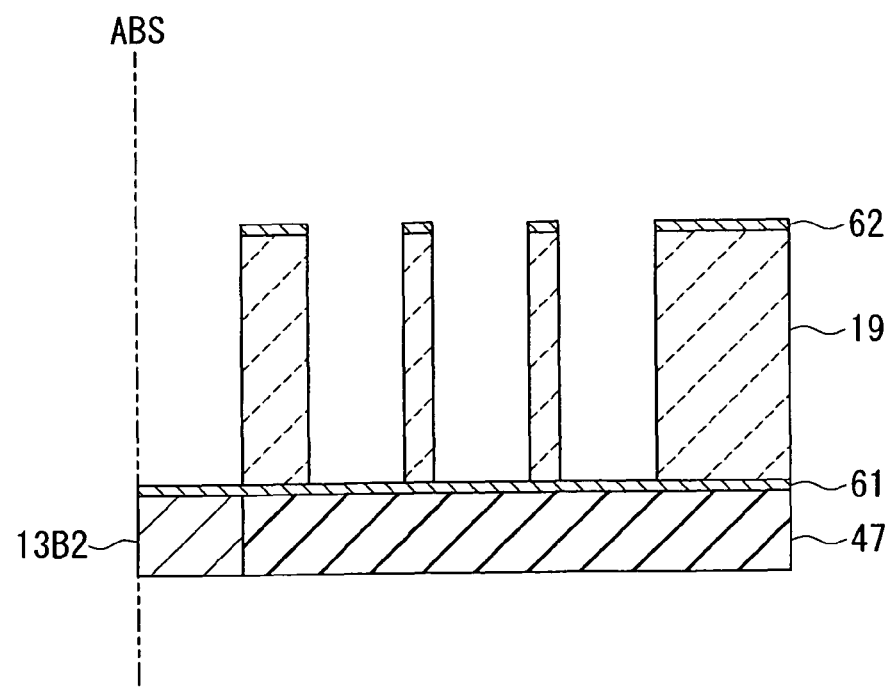

FIG. 8A and FIG. 8B illustrate the next step. In this step, a portion of the nonmagnetic layer 19P is etched using the metal film 62 as a mask. In this etching, the etching stopper film 61 functions as an etching stopper. Specifically, the etching of the nonmagnetic layer 19P stops when the bottom of the groove formed by the etching reaches the top surface of the etching stopper film 61. As a result of this etching, the grooves 19a, 19b and 19c are formed in the nonmagnetic layer 19P, and the nonmagnetic layer 19P thereby becomes the coil adjacent layer 19.

The etching of the nonmagnetic layer 19P is performed by, for example, reactive ion etching (hereinafter referred to as RIE). In the case where SiC is selected as the nonmagnetic material to form the coil adjacent layer 19, a gas containing $SF_6$ is suitable as the etching gas used for etching the nonmagnetic layer 19P by RIE. Other suitable etching gases include a gas containing $CF_4$, a gas containing $CF_4$ and $O_2$, and a gas containing $Cl_2$.

Figure 9A:
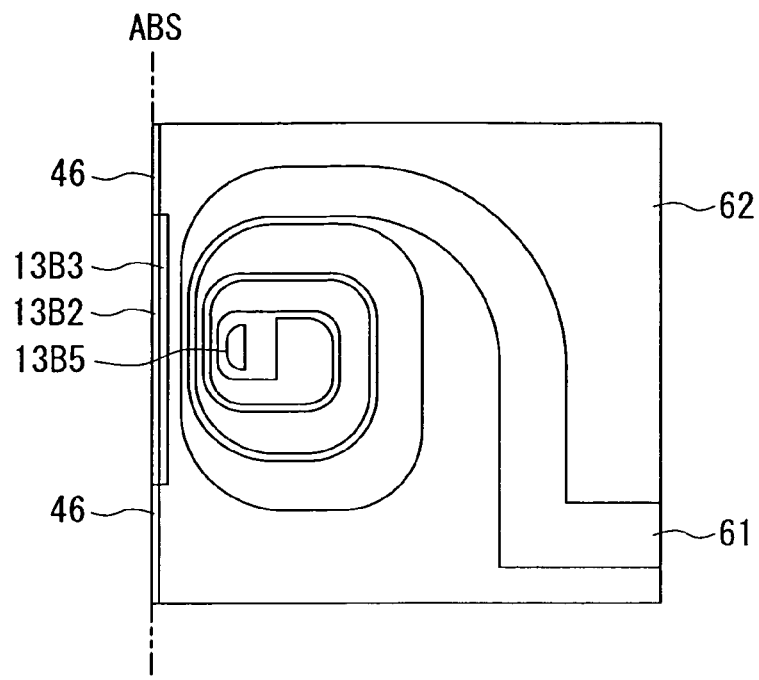
FIG. 9A and FIG. 9B are explanatory views illustrating a step that follows the step of FIG. 8A and FIG. 8B.
Figure 9B:
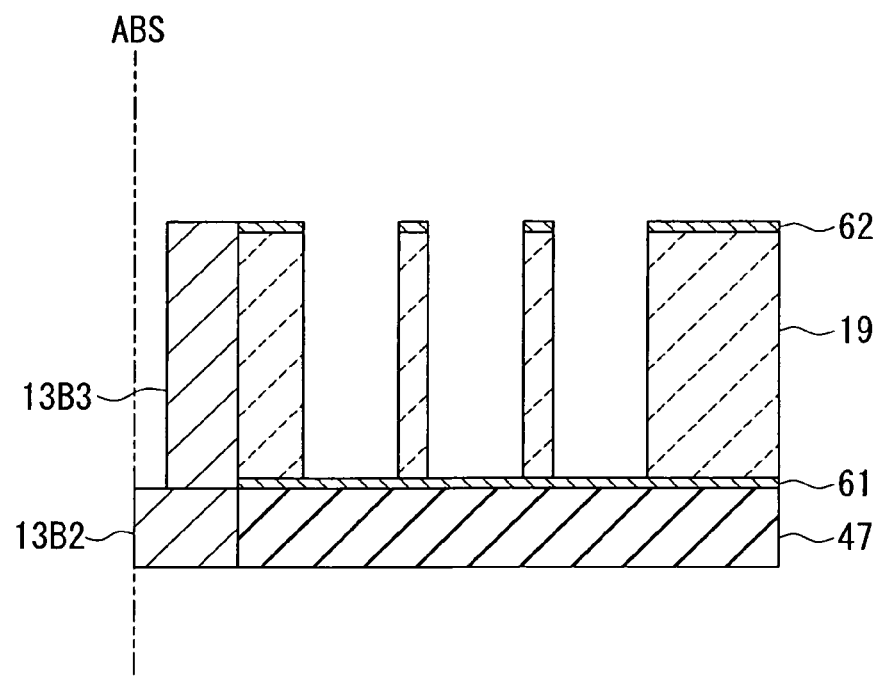

FIG. 9A and FIG. 9B illustrate the next step. In this step, first, the etching stopper film 61 is selectively removed by, for example, ion milling, at the region where the third layer 13B3 and the fifth layer 13B5 are to be disposed later. Next, the third layer 13B3 is formed on the second layer 13B2 in the groove 19a, and the fifth layer 13B5 is formed on the sixth layer 13B6 in the groove 19b, each by frame plating, for example. Next, as necessary, the top surfaces of the third layer 13B3, the fifth layer 13B5 and the metal film 62 are flattened by, for example, CMP.

Figure 10A:
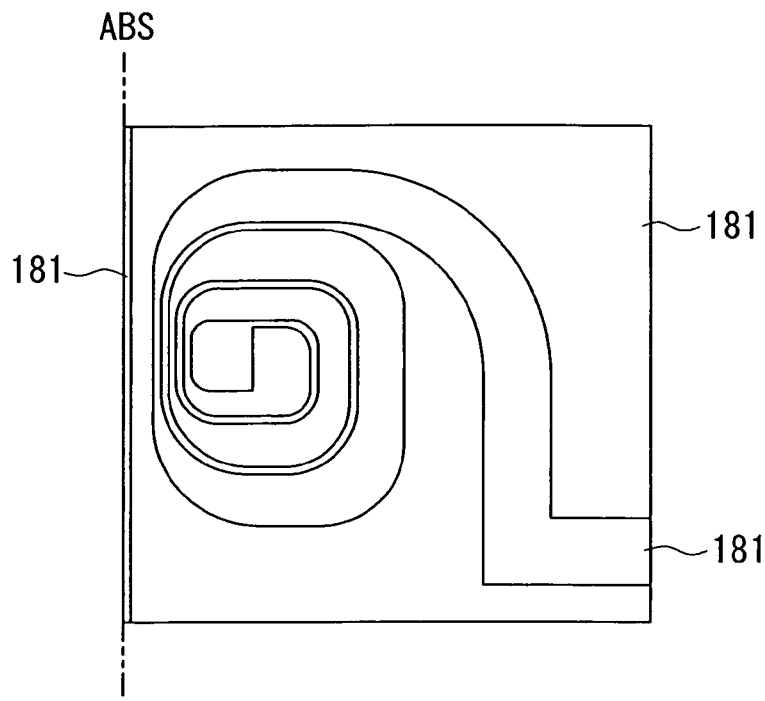
FIG. 10A and FIG. 10B are explanatory views illustrating a step that follows the step of FIG. 9A and FIG. 9B.
Figure 10B:
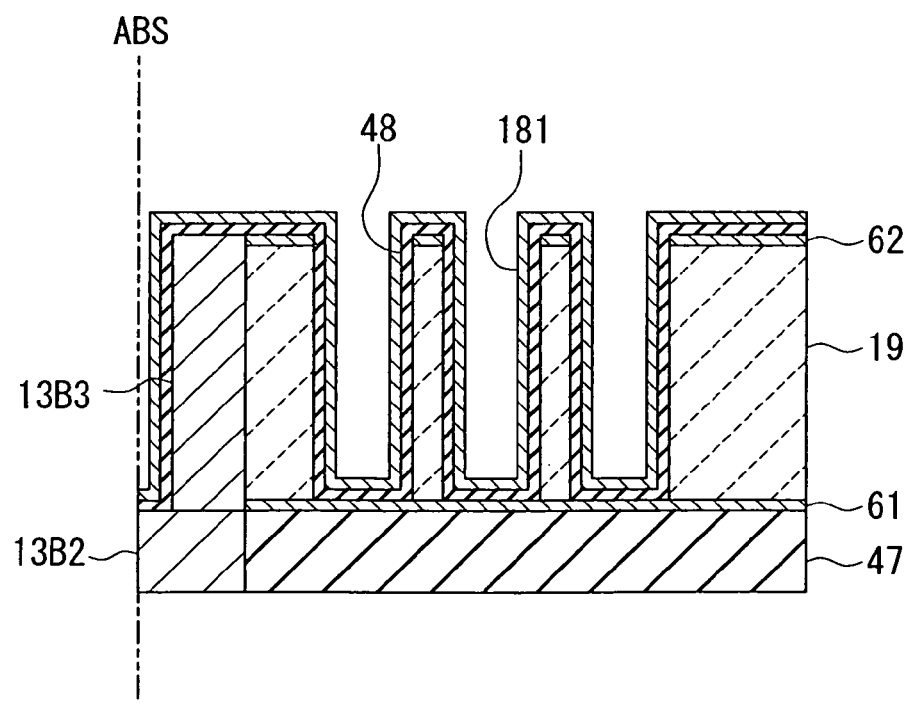

FIG. 10A and FIG. 10B illustrate the next step. In this step, first, the insulating film 48 is formed over the entire top surface of the stack. The insulating film 48 is formed also in the grooves of the coil adjacent layer 19. The insulating film 48 is formed by, for example, CVD or so-called atomic layer CVD (hereinafter referred to as ALCVD), which is a type of CVD in which formation of a single atomic layer is repeated. In the case of employing CVD or ALCVD to form the insulating film 48, alumina is suitable as the material of the insulating film 48. The insulating film 48 may also be formed of $SiO_2$ by employing CVD.

Next, an electrode film 181 is formed over the entire top surface of the stack by, for example, sputtering. The electrode film 181 is formed also in the grooves of the coil adjacent layer 19. The electrode film 181 is to function as an electrode and a seed layer when a plating film is formed later in the grooves of the coil adjacent layer 19 by frame plating. The electrode film 181 is formed of a conductive material such as copper.

Figure 11A:
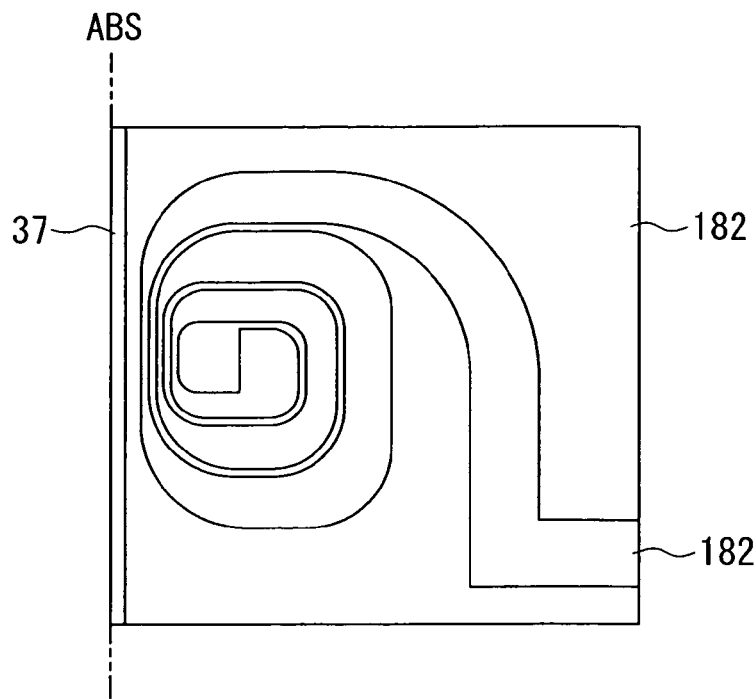
FIG. 11A and FIG. 11B are explanatory views illustrating a step that follows the step of FIG. 10A and FIG. 10B.
Figure 11B:
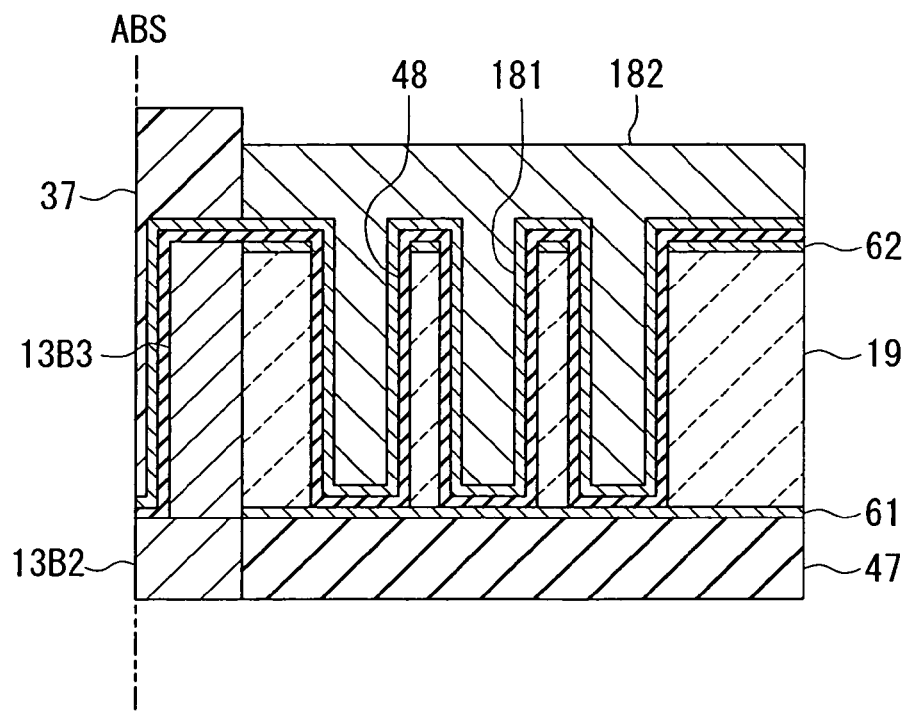

FIG. 11A and FIG. 11B illustrate the next step. In this step, first, a photoresist layer is formed over the entire top surface of the stack. Next, the photoresist layer is patterned to thereby form a frame 37 having an opening. The opening of the frame 37 is greater in size than the region in which the coil 18 is to be formed later.

Next, a plating film 182 is formed in the opening of the frame 37 by electroplating through the use of the electrode film 181 as an electrode. The plating film 182 is formed such that the grooves of the coil adjacent layer 19 are filled with the plating film 182 and that the top surface of the plating film 182 is located higher than the top surface of a portion of the electrode film 181 located on the top surface of the coil adjacent layer 19. The plating film 182 is formed of a conductive material such as copper.

Figure 12A:
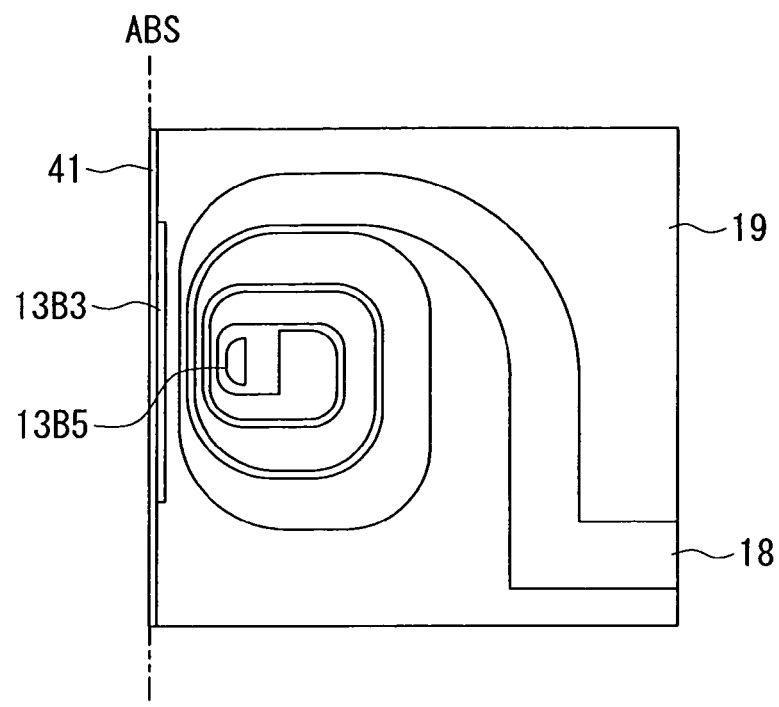
FIG. 12A and FIG. 12B are explanatory views illustrating a step that follows the step of FIG. 11A and FIG. 11B.
Figure 12B:
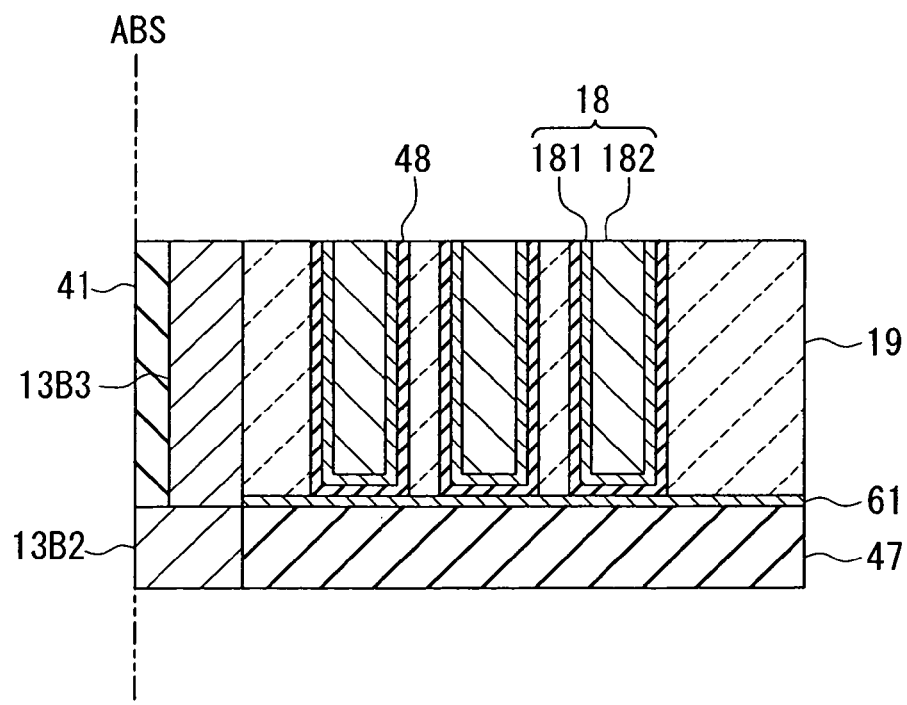

FIG. 12A and FIG. 12B illustrate the next step. In this step, first, the frame 37 is removed. Next, a portion of the electrode film 181 other than a portion thereof located below the plating film 182 is removed by, for example, ion milling. Next, the insulating layer 41 is formed over the entire top surface of the stack by, for example, sputtering. Next, the insulating layer 41, the plating film 182, the electrode film 181, the insulating film 48 and the metal film 62 are polished by, for example, CMP, until the third layer 13B3, the fifth layer 13B5 and the coil adjacent layer 19 become exposed. In this polishing, the coil adjacent layer 19 functions as a polishing stopper for stopping the polishing. As a result of this polishing, the coil 18 is formed by portions of the electrode film 181 and the plating film 182 remaining in the groove 19c of the coil adjacent layer 19. FIG. 12B depicts the insulating layer 41 as including a part of the insulating film 48 covering the side surface of the third layer 13B3 facing toward the medium facing surface 30.

Next, as illustrated in FIG. 1, the insulating layer 20 is formed to cover the coil 18 and the coil adjacent layer 19. Next, the fourth layer 13B4 is formed to complete the shield 13. Next, the protection layer 42 is formed to cover the entire top surface of the stack. Next, wiring and terminals are formed on the protection layer 42, the substrate is cut into sliders, and processing including polishing of the medium facing surface 30 and fabrication of flying rails is performed, whereby the magnetic head is completed.

The operation and effects of the magnetic head of the present embodiment will now be described. In this magnetic head, the write head writes data on a recording medium while the read head reads data written on the recording medium. In the write head, the coils 11 and 18 generate magnetic fields corresponding to data to be written on the recording medium. A magnetic flux corresponding to the magnetic field generated by the coil 11 passes through the first portion 13A of the shield 13 and the pole layer 12. A magnetic flux corresponding to the magnetic field generated by the coil 18 passes through the second portion 13B of the shield 13 and the pole layer 12. Consequently, the pole layer 12 allows the magnetic flux corresponding to the magnetic field generated by the coil 11 and the magnetic flux corresponding to the magnetic field generated by the coil 18 to pass.

The coils 11 and 18 may be connected in series or in parallel. In either case, the coils 11 and 18 are connected such that the magnetic flux corresponding to the magnetic field generated by the coil 11 and the magnetic flux corresponding to the magnetic field generated by the coil 18 flow in the same direction in the pole layer 12.

The pole layer 12 allows the magnetic fluxes corresponding to the magnetic fields generated by the coils 11 and 18 to pass as mentioned above, and generates a write magnetic field used for writing data on the recording medium by means of the perpendicular magnetic recording system.

The shield 13 takes in a disturbance magnetic field applied to the magnetic head from outside of the magnetic head. As a result, it is possible to prevent erroneous writing on the recording medium induced by the disturbance magnetic field intensively taken into the pole layer 12. Furthermore, the shield 13 has a function of taking in a magnetic flux that is generated from the end face of the pole layer 12 and that expands in directions except the direction perpendicular to the plane of the recording medium, and thus preventing this magnetic flux from reaching the recording medium. The shield 13 also has a function of returning a magnetic flux that has been generated from the end face of the pole layer 12 and has magnetized the recording medium.

The shield 13 includes the first portion 13A disposed backward of the pole layer 12 along the direction T of travel of the recording medium, and the second portion 13B disposed forward of the pole layer 12 along the direction T of travel of the recording medium. Consequently, according to the present embodiment, in regions both backward and forward of the end face of the pole layer 12 along the direction T of travel of the recording medium, it is possible to take in the magnetic flux that is generated from the end face of the pole layer 12 and that expands in directions except the direction perpendicular to the plane of the recording medium, and to thereby prevent this flux from reaching the recording medium. The present embodiment thus makes it possible that a phenomenon of attenuation of signals written on one or more tracks adjacent to a track targeted for writing or reading is suppressed over a wide range along the track width direction.

Furthermore, in the present embodiment, magnetic fluxes corresponding to the magnetic fields generated by the two coils 11 and 18 pass through the pole layer 12. Consequently, according to the present embodiment, it is possible to make the number of turns of each of the coils 11 and 18 smaller than that of a single coil of a magnetic head in which the coil is the only one coil provided. This makes it possible to reduce the resistance of each of the coils 11 and 18 and to thereby reduce the heat value of each of the coils 11 and 18. As a result, according to the present embodiment, it is possible to suppress protrusion of part of the medium facing surface 30 induced by the heat generated by the coils 11 and 18.

The position of an end of the bit pattern to be written on the recording medium is determined by the position of one end of the end face of the pole layer 12 located in the medium facing surface 30, the one end being located forward along the direction T of travel of the recording medium. Therefore, to define the position of the end of the bit pattern precisely, it is important to take in a magnetic flux, particularly at a position forward of the end face of the pole layer 12 along the direction T of travel of the recording medium, the flux being generated from the end face of the pole layer 12 and expanding in directions except the direction perpendicular to the plane of the recording medium, and to thereby prevent this flux from reaching the recording medium. In the present embodiment, the first portion 13A of the shield 13 has an end face closer to the medium facing surface 30 and this end face is located at a distance from the medium facing surface 30, while the second portion 13B of the shield 13 has an end face located in the medium facing surface 30. The end face of the second portion 13B is located forward of the end face of the pole layer 12 along the direction T of travel of the recording medium, with a predetermined small distance provided therebetween by the thickness of the gap layer 14. As a result, particularly at a position forward of the end face of the pole layer 12 along the direction T of travel of the recording medium, it is possible to effectively take in the magnetic flux generated from the end face of the pole layer 12 and expanding in directions except the direction perpendicular to the plane of the recording medium, and to thereby prevent the flux from reaching the recording medium. Furthermore, in the present embodiment, the first portion 13A and the second portion 13B of the shield 13 are coupled to each other by the coupling portions 13C1, 13C2, 13C3 and 13C4. Consequently, the magnetic flux taken in at the end face of the second portion 13B can pass not only through the second portion 13B but also through the first portion 13A. According to the present embodiment, it is thus possible to take in magnetic flux of great magnitude at the end face of the second portion 13B. As a result, according to the present embodiment, it is possible to precisely define the position of the end of the bit pattern to be written on the recording medium. This allows an improvement in linear recording density.

Furthermore, in the present the embodiment, as illustrated in FIG. 2, the end face of the pole layer 12 located in the medium facing surface 30 has a width that decreases with increasing distance from the gap layer 14. This makes it possible to prevent the occurrence of a phenomenon in which, when data is written on a certain track, data on a track adjacent thereto is erased due to a skew.

Furthermore, in the present the embodiment, the pole layer 12 is disposed in the groove 25a of the pole-layer-encasing layer 25 formed of a nonmagnetic material, with the nonmagnetic films 27 and 28 located in between. Consequently, the width of the pole layer 12 is smaller than that of the groove 25a. This makes it easy to form the groove 25a, and makes it easy to reduce the width of the pole layer 12, or the width of the top surface of the track width defining portion 12A that defines the track width, in particular. Consequently, according to the present embodiment, it is possible to provide a track width smaller than the minimum track width that can be formed by photolithography, and to control the track width with accuracy.

In the present embodiment, the first layer 13B1 and the second layer 13B2 of the second portion 13B of the shield 13 are exposed at the medium facing surface 30. In other words, each of the first layer 13B1 and the second layer 13B2 has an end face located in the medium facing surface 30. If the end face of the first layer 13B1 and/or the end face of the second layer 13B2 protrudes during operation of the magnetic head due to heat generated by the coil 18 located near the first layer 13B1 and the second layer 13B2, it is difficult to reduce the flying height of the slider, and consequently it is difficult to improve the recording density and the signal-to-noise ratio.

According to the present embodiment, the coil adjacent layer 19 functions to suppress the protrusion of the end face of each of the first layer 13B1 and the second layer 13B2 induced by the heat generated by the coil 18. This will now be described in detail.

The coil adjacent layer 19 is formed of a nonmagnetic material having a linear thermal expansion coefficient of $5 \times 10^{-6}$/° C. or smaller at a temperature of 25° C. to 100° C. and having a thermal conductivity of 40 W/m·K or higher at a temperature of 25° C. Examples of the nonmagnetic materials satisfying this requirement include SiC, AlN, and W. SiC has a linear thermal expansion coefficient of approximately $4.0 \times 10^{-6}$/° C. at a temperature of 25° C. to 100° C. SiC has a thermal conductivity of approximately 75 W/m·K at a temperature of 25° C. AlN has a linear thermal expansion coefficient of approximately $4.5 \times 10^{-6}$/° C. at a temperature of 25° C. to 100° C. AlN has a thermal conductivity of approximately 170 W/m·K at a temperature of 25° C. W has a linear thermal expansion coefficient of approximately $4.5 \times 10^{-6}$/° C. at a temperature of 25° C. to 100° C. W has a thermal conductivity of approximately 170 W/m·K at a temperature of 25° C.

Alumina, which is typically used as a material of an insulating layer in a magnetic head, has a linear thermal expansion coefficient of approximately $6.5 \times 10^{-6}$/° C. at a temperature of 25° C. to 100° C. The material of the coil adjacent layer 19 has a linear thermal expansion coefficient of $5 \times 10^{-6}$/° C. or smaller at a temperature of 25° C. to 100° C., which means that the material of the coil adjacent layer 19 is sufficiently smaller in linear thermal expansion coefficient than alumina. Accordingly, the coil adjacent layer 19 is more resistant to heat-induced expansion, compared with an insulating layer formed of alumina. Consequently, according to the present embodiment, it is possible to suppress expansion of the coil adjacent layer 19 induced by heat generated by the coil 18.

Alumina has a thermal conductivity of approximately 30 W/m·K at a temperature of 25° C. The material of the coil adjacent layer 19 has a thermal conductivity of 40 W/m·K or higher at a temperature of 25° C., which means that the material of the coil adjacent layer 19 is sufficiently higher in thermal conductivity than alumina. Consequently, according to the present embodiment, the coil adjacent layer 19 accelerates dissipation of the heat generated by the coil 18. Specifically, the heat generated by the coil 18 is fast transferred by the coil adjacent layer 19 to the second portion 13B of the shield 13. During operation of the magnetic head, the medium facing surface 30 is cooled by an airflow passing between the medium facing surface 30 and the recording medium. Consequently, the heat transferred to the second portion 13B is released to the outside of the magnetic head from the first layer 13B1 and the second layer 13B2 exposed at the medium facing surface 30. The heat generated by the coil 18 is thus effectively dissipated.

Thus, according to the present embodiment, the properties of the coil adjacent layer 19 of being small in heat-induced expansion and being good in thermal conductivity serve to suppress the protrusion of part of the medium facing surface 30, especially the end face of the first layer 13B1 and the end face of the second layer 13B2, induced by the heat generated by the coil 18.

FIG. 5 illustrates an example in which the coil adjacent layer 19 is adjacent to the whole of the two side surfaces 18a1 and 18a2 of the winding portion 18a of the coil 18. However, the coil adjacent layer 19 may be adjacent to only part of the whole of the two side surfaces 18a1 and 18a2 of the winding portion 18a. For example, the coil adjacent layer 19 may be adjacent to only the outer side surface 18a1 of the outermost turn of the winding portion 18a. In this case, the space between every adjacent turns of the winding portion 18a is filled with an insulating material such as alumina. Alternatively, the coil adjacent layer 19 may be disposed only in the space between every adjacent turns of the winding portion 18a. In this case, an insulating layer made of, e.g., alumina, is disposed on the outer side of the outermost turn of the winding portion 18a. Even in the case where the coil adjacent layer 19 is adjacent to only part of the whole of the two side surfaces 18a1 and 18a2 of the winding portion 18a, the properties of the coil adjacent layer 19 of being small in heat-induced expansion and being good in thermal conductivity allow suppression of the protrusion of part of the medium facing surface 30 induced by the heat generated by the coil 18.

In order to suppress displacement of the coil adjacent layer 19 resulting from, e.g., expansion of the coil 18, it is desirable that the nonmagnetic material used to form the coil adjacent layer 19 have high hardness. SiC has a Vickers hardness higher than that of alumina. In view of this, SiC is particularly preferred as the nonmagnetic material to form the coil adjacent layer 19.

In the case where a nonmagnetic material having a hardness higher than that of alumina, such as SiC, is used to form the coil adjacent layer 19, if the coil adjacent layer 19 is designed to be exposed at the medium facing surface 30, there is a possibility of protrusion of the coil adjacent layer 19 at the medium facing surface 30 formed by polishing. This is because a nonmagnetic material having a hardness higher than that of alumina is more resistant to polishing than alumina when polishing is performed to form the medium facing surface 30. In the present embodiment, however, the coil adjacent layer 19 is not exposed at the medium facing surface 30. Consequently, according to the present embodiment, there is no possibility of protrusion of the coil adjacent layer 19 at the medium facing surface 30 even when a nonmagnetic material having a hardness higher than that of alumina, such as SiC, is used to form the coil adjacent layer 19.

When a conductive material such as SiC or W is selected as the nonmagnetic material to form the coil adjacent layer 19, the insulating film 48 is required for insulation between the coil adjacent layer 19 and the coil 18. On the other hand, the insulating film 48 is not required when an insulating material such as AlN is selected as the nonmagnetic material to form the coil adjacent layer 19 and the etching stopper film 61, which is conductive, is not provided below the coil adjacent layer 19.

The present invention is not limited to the foregoing embodiment but can be carried out in various modifications. For example, materials usable for the coil adjacent layer of the present invention are not limited to those illustrated in the foregoing embodiment, and any nonmagnetic material can be used as long as it has a linear thermal expansion coefficient of $5 \times 10^{-6}$/° C. or smaller at a temperature of 25° C. to 100° C. and has a thermal conductivity of 40 W/m·K or higher at a temperature of 25° C.

The coil may be a coil wound around the pole layer 12 in a helical manner so as to pass through the space surrounded by the pole layer 12 and the first portion 13A of the shield 13 and the space surrounded by the pole layer 12 and the second portion 13B of the shield 13. In this case, the portion of the coil passing through the space surrounded by the pole layer 12 and the second portion 13B of the shield 13 is disposed in the groove 19c of the coil adjacent layer 19.

While the foregoing embodiment has been described with reference to a magnetic head having a structure in which the read head is formed on the base body and the write head is stacked on the read head, the read head and the write head may be stacked in the reverse order.

The magnetic head and the method of manufacturing the same of the present invention are applicable not only to a magnetic head for perpendicular magnetic recording but also to a magnetic head for longitudinal magnetic recording.

It is apparent that the present invention can be carried out in various forms and modifications in the light of the foregoing descriptions. Accordingly, within the scope of the following claims and equivalents thereof, the present invention can be carried out in forms other than the foregoing most preferred embodiment.

What is claimed is:

1. A magnetic head comprising:
   a medium facing surface that faces toward a recording medium;
   a coil including a winding portion having two side surfaces, the coil generating a magnetic field corresponding to data to be written on the recording medium;
   a pole layer having an end face located in the medium facing surface, the pole layer allowing a magnetic flux corresponding to the magnetic field generated by the coil to pass and generating a write magnetic field for writing the data on the recording medium by means of a perpendicular magnetic recording system;
   a shield formed of a magnetic material;
   a gap layer formed of a nonmagnetic material; and
   a coil adjacent layer that is adjacent to at least part of the whole of the two side surfaces of the winding portion, wherein:
   the shield has an end face located in the medium facing surface at a position forward of the end face of the pole layer along a direction of travel of the recording medium;
   the gap layer is disposed between the pole layer and the shield;
   the shield includes a plurality of layers;
   one of the plurality of layers of the shield is located between the coil and the medium facing surface;
   the coil adjacent layer has a first groove that accommodates the one of the plurality of layers of the shield, and a second groove that accommodates at least part of the winding portion; and
   the coil adjacent layer is formed of a nonmagnetic material having a linear thermal expansion coefficient of $5 \times 10^{-6}$/° C. or smaller at a temperature of 25° C. to 100° C. and having a thermal conductivity of 40 W/m·K or higher at a temperature of 25° C.

2. The magnetic head according to claim 1, wherein the nonmagnetic material used to form the coil adjacent layer is one of SiC and W, and the magnetic head further comprises an insulating film disposed between the coil adjacent layer and the at least part of the whole of the two side surfaces of the winding portion.

3. The magnetic head according to claim 1, wherein the nonmagnetic material used to form the coil adjacent layer is AlN.

4. The magnetic head according to claim 1, wherein the coil adjacent layer is not exposed at the medium facing surface.

5. The magnetic head according to claim 1, further comprising an insulating layer disposed underneath the coil.

6. The magnetic head according to claim 1, further comprising an etching stopper film disposed underneath the coil adjacent layer, wherein the coil adjacent layer is disposed between every adjacent turns of the winding portion such that the coil adjacent layer comes in contact with the etching stopper film.

7. A method of manufacturing the magnetic head of claim 1, comprising the steps of:
   forming the pole layer;
   forming the gap layer;
   forming the coil adjacent layer;
   forming the shield; and
   forming the coil, wherein
   the step of forming the coil adjacent layer includes the steps of:
      forming a nonmagnetic layer made of the nonmagnetic material used to form the coil adjacent layer; and
      forming the first and second grooves in the nonmagnetic layer so that the nonmagnetic layer becomes the coil adjacent layer,
   in the step of forming the shield, the one of the plurality of layers of the shield is formed to be accommodated in the first groove after the step of forming the first and second grooves, and
   in the step of forming the coil the coil is formed such that at least part of the coil is accommodated in the second groove after the step of forming the first and second grooves.

8. The method according to claim 7, wherein the nonmagnetic material used to form the coil adjacent layer is one of SiC and W, and the magnetic head further comprises an insulating film disposed between the coil adjacent layer and the at least part of the whole of the two side surfaces of the winding portion,
   the method further comprising the step of forming the insulating film performed between the step of forming the coil adjacent layer and the step of forming the coil.

9. The method according to claim 7, wherein the nonmagnetic material used to form the coil adjacent layer is AlN.

10. The method according to claim 7, wherein the coil adjacent layer is not exposed at the medium facing surface.

11. The method according to claim 7, wherein the magnetic head further comprises an insulating layer disposed underneath the coil, and
   the method further comprises a step of forming the insulating layer before the coil adjacent layer is formed.

12. The method according to claim 7, wherein the magnetic head further comprises an etching stopper film disposed underneath the coil adjacent layer, and the coil adjacent layer is disposed between every adjacent turns of the winding portion such that the coil adjacent layer comes in contact with the etching stopper film, and
   the method further comprises the step of forming the etching stopper film before the nonmagnetic layer is formed, wherein:
   in the step of forming the nonmagnetic layer, the nonmagnetic layer is formed on the etching stopper film; and
   in the step of forming the groove in the nonmagnetic layer, the groove is formed by etching a portion of the nonmagnetic layer such that the etching of the portion of the nonmagnetic layer stops when a bottom of the groove reaches a top surface of the etching stopper film.

* * * * *